(12) United States Patent
Medved et al.

(10) Patent No.: US 8,700,801 B2
(45) Date of Patent: Apr. 15, 2014

(54) DYNAMICALLY GENERATING APPLICATION-LAYER TRAFFIC OPTIMIZATION PROTOCOL MAPS

(75) Inventors: Jan Medved, Pleasanton, CA (US); Hannes Gredler, Pillberg (AT); David Ward, Los Gatos, CA (US); Satish Raghunath, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

(21) Appl. No.: 13/110,987

(22) Filed: May 19, 2011

(65) Prior Publication Data

US 2012/0144066 A1 Jun. 7, 2012

Related U.S. Application Data

(60) Provisional application No. 61/418,793, filed on Dec. 1, 2010, provisional application No. 61/449,499, filed on Mar. 4, 2011.

(51) Int. Cl.
H04L 29/06 (2006.01)

(52) U.S. Cl.
USPC .......................................................... 709/242

(58) Field of Classification Search
USPC .......... 709/203, 220, 238–244; 370/351–352, 370/370, 389, 392, 401, 395.2, 395.31, 370/395.5
See application file for complete search history.

(56) References Cited

U.S. PATENT DOCUMENTS

| | | | |
|---|---|---|---|
| 7,599,349 B2 | 10/2009 | Vasseur et al. | |
| 7,716,662 B2 | 5/2010 | Seiden | |
| 7,978,708 B2 * | 7/2011 | Filsfils et al. | 370/395.31 |
| 8,179,801 B2 * | 5/2012 | Previdi et al. | 370/238 |
| 2002/0062310 A1 | 5/2002 | Marmor et al. | |
| 2002/0128768 A1 | 9/2002 | Nakano et al. | |
| 2003/0179742 A1 | 9/2003 | Ogier et al. | |
| 2005/0170845 A1 | 8/2005 | Moran | |
| 2007/0064702 A1 * | 3/2007 | Bates et al. | 370/392 |
| 2009/0122718 A1 * | 5/2009 | Klessig et al. | 370/254 |

(Continued)

FOREIGN PATENT DOCUMENTS

WO 2011054913 A1 5/2011

OTHER PUBLICATIONS

Alimi et al., "ALTO Protocol," draft-ietf-alto-protocol-03.txt, ALTO WG Internet-Draft, Mar. 8, 2010, 53 pp.

(Continued)

*Primary Examiner* — Ricky Ngo
*Assistant Examiner* — Lan Truong
(74) *Attorney, Agent, or Firm* — Shumaker & Sieffert, P.A.

(57) ABSTRACT

In general, techniques are described for using routing information obtained by operation of network routing protocols to dynamically generate network and cost maps for an application-layer traffic optimization (ALTO) service. For example, an ALTO server of an autonomous system (AS) receives routing information from routers of the AS by listening for routing protocol updates outputted by the routers and uses the received topology information to dynamically generate a network map of PIDs that reflects a current topology of the AS and/or of the broader network that includes the AS. Additionally, the ALTO server dynamically calculates inter-PID costs using received routing information that reflects current link metrics. The ALTO server then assembles the inter-PID costs into a cost map that the ALTO server may provide, along with the network map, to clients of the ALTO service.

43 Claims, 15 Drawing Sheets

(56) References Cited

U.S. PATENT DOCUMENTS

| | | |
|---|---|---|
| 2010/0161755 A1 | 6/2010 | Li et al. |
| 2010/0208741 A1 | 8/2010 | Vasseur |
| 2010/0293294 A1 | 11/2010 | Hilt et al. |
| 2011/0078230 A1 | 3/2011 | Sepulveda |
| 2011/0202651 A1 | 8/2011 | Hilt et al. |
| 2011/0276718 A1 | 11/2011 | Steiner et al. |
| 2012/0066368 A1* | 3/2012 | Li et al. .................. 709/223 |
| 2012/0317293 A1 | 12/2012 | Gu et al. |

OTHER PUBLICATIONS

Alimi et al., "ALTO Protocol," draft-ietf-alto-protocol-06.txt, ALTO WG Internet-Draft, Oct. 25, 2010, 66 pp.

Penno et al., "ALTO Protocol," draft-penno-alto-protocol-00.txt, ALTO WG, Internet-Draft, Mar. 4, 2009, 22 pp.

Penno et al., "ALTO and Content Delivery Networks," draft-penno-alto-cdn-00, Network Working Group, Internet Draft, Jun. 4, 2010, 19 pp.

Penno et al., "ALTO and Content Delivery Networks", draft-penno-alto-cdn-03, Network Working Group, Internet Draft, Mar. 14, 2011, 28 pp.

Zimmermann, "OSI Reference Model—The ISO Model of Architecture for Open Systems Interconnection," IEEE Transactions on Communications, vol. 28, No. 4, Apr. 1980, pp. 425-432.

Seedorf et al., "Application-Layer Traffic Optimization (ALTO) Problem Statement," RFC 5693, Network Working Group, Oct. 2009, 15 pp.

Rekhter et al., "A Border Gateway Protocol 4 (BGP-4)", Network Working Group, RFC 4271, Jan. 2006, 93 pp.

Gredler et al., "Advertising Traffic Engineering Information in BGP", draft-gredler-bgp-te-00, Inter-Domain Routing, Internet Draft, published Mar. 4, 2011, 18 pp.

Chandra et al., "BGP Communities Attribute", Network Working Group, RFC 1997, Aug. 1996, 6 pp.

U.S. Appl. No. 12/235,677, by Anjan Venkatramani, filed Sep. 23, 2008.

U.S. Appl. No. 12/861,645, by Jan Medved, filed Aug. 23, 2010.

U.S. Appl. No. 12/942,678, by Jan Medved, filed Nov. 9, 2010.

U.S. Appl. No. 12/861,671, by Jan Medved, filed Aug. 23, 2010.

U.S. Appl. No. 12/861,681, by Satish Raghunath, filed Aug. 23, 2010.

Corresponding European Patent Application Publication No. 2461547, including Search Report for European Patent Application No. 11191369.5, dated Mar. 8, 2012, 46 pages.

Extended Search Report from European Application No. 11191369.5., dated Mar. 15, 2012, 8 pp.

Response to Extended Search Report dated Jun. 12, 2012, from European Patent Application No. 11191369.5, filed Nov. 27, 2012, 8 pp.

Li et al., "IS-IS Extensions for Traffic Engineering," Network Working Group, RFC 5305, Oct. 2008, 15 pp.

Seedorf et al., "Traffic Localization for P2P-Applications: The ALTO Approach," IEEE P2P'09, Sep. 9-11, 2009, pp. 171-177.

Sheng et al., "Application Layer Traffic Optimization in the eMule System," 2010 Fifth International Conference on Internet and Web Applications and Services, May 9-15, 2010, pp. 217-222.

Ye et al., "A Scheme to Solve P2P ALTO Problem," 2010 Second International Workshop on Education Technology and Computer Science, Mar. 6-7, 2010, pp. 459-462.

\* cited by examiner

DYNAMICALLY GENERATING APPLICATION-LAYER TRAFFIC OPTIMIZATION PROTOCOL MAPS

This application claims the benefit of U.S. Provisional Application No. 61/418,793, filed Dec. 1, 2010, the entire content of which is incorporated by reference herein. This application claims the benefit of U.S. Provisional Application No. 61/449,499, filed Mar. 4, 2011, the entire content of which is incorporated by reference herein.

TECHNICAL FIELD

The invention relates to computer networks and, more specifically, to enhancing content delivery.

BACKGROUND

Peer-to-peer (P2P) and content delivery networks (CDNs) applications serve large amounts of data and generate significant amounts of network traffic. These applications leverage multiple copies of data content populated to multiple different network nodes to allow a requesting agent to obtain portions of the data content from one or more of many possible data sources. Distributing data content to multiple nodes for delivery on behalf of applications such as file sharing, real-time communication, and on-demand media streaming improves application performance and scalability.

P2P and CDN application clients often select resources naively, that is, without incorporating network topology information or related details. Rather, clients rely on heuristics to approximate such information. As a result, network data traffic exchanged using these applications may congest network links, cross service provider network boundaries multiple times, and generally transit the communication network in a manner that is suboptimal from a user-standpoint and undesirable from the point of view of the service provider. For instance, while two peers may be members of the same service provider network, an overlay link connecting the peers may nevertheless traverse multiple network boundaries, which unnecessarily increases the inter-peer transit costs to the service provider. Furthermore, although distributed applications capitalize on excess bandwidth at the data sources to improve throughput and reduce latencies for end-users while also reducing the burden of content providers to provision application servers, the ability to cheaply distribute data content comes at the expense of service providers, which bear the cost of inefficiently transporting network data.

A service provider, content provider, or a third party may provide an Application-Layer Traffic Optimization (ALTO) protocol service to provide guidance to application clients and content request routers regarding selection of a particular resource from which to obtain data content. The ALTO service provides information that incorporates provider preferences with regard to network resources to influence network resource consumption patterns while maintaining or improving application performance. In one example, a service provider provisions an ALTO server for a service provider network with network topology and topology link cost information. Application clients and content request routers send ALTO requests to the ALTO server to obtain a network map and a corresponding cost map. The network map specifies a set of topological groupings, or "PIDs," defined by the ALTO server for the network. A particular PID within a network map may represent a single device or device component, a collection of devices such as a network subnet identified by a network address prefix, a service provider network, or some other grouping. A cost map for a corresponding network map defines provider preferences respecting inter-PID routing costs for connections among the various PIDs of the network map. Using the network map and cost map provided by the ALTO server, application clients and content request routers select serving resources to minimize costs, as specified by the ALTO maps, between content requesting clients and available resources.

As a result, service providers provisioning the ALTO server may direct application clients and request routers to select resources according to service provider preferences, which may include optimizing throughput and/or user experience, for instance, reducing costs to the service provider, or promoting other provider objectives. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety.

SUMMARY

In general, techniques are described for using routing information obtained by operation of network routing protocols to dynamically generate network and cost maps for an application-layer traffic optimization service, such as that provided by the Application-Layer Traffic Optimization (ALTO) protocol. In one example, an ALTO server of an autonomous system (AS) receives routing information, such as topology, link state, and link metrics information, from routers of the AS by listening for routing protocol updates output by the routers. In other words, the ALTO server may execute layer three (L3) routing protocols so as to snoop or otherwise receive routing protocol update messages exchanged between L3 routing devices within the network. Based on the routing protocol update messages, the ALTO server assembles topology information representative of the network. Topology information snooped by the ALTO server may include information that describes the intra-AS topology of the AS that includes the receiving ALTO server, as well as information that describes intra-AS topologies of neighboring autonomous systems and of an inter-AS topology of multiple, interconnected autonomous systems. The ALTO server uses the assembled topology information to dynamically generate an ALTO network map of PIDs that reflects a current topology of the AS that includes the ALTO server and/or of the broader network that includes additional ASes. In some cases, the ALTO server functionality may be incorporated within an L3 routing device of the network that operates as a peer to other routers within the network.

Link metrics (e.g., distance or throughput) received by the ALTO server in routing protocol updates, autonomous system path lengths, and administratively configured data determine current inter-PID costs among the PIDs of the dynamically generated network map. The ALTO server dynamically calculates inter-PID costs using received routing information that reflects current link metrics. The ALTO server then assembles the inter-PID costs into an ALTO cost map that the ALTO server may provide, along with the ALTO network map, to ALTO clients.

Additionally, a master ALTO server may interact with ALTO servers of other federated autonomous systems to receive network and cost maps generated in the AS-internal ALTO Servers according to their respective network topology perspectives. Using the detailed topology and cost information included within such maps for remote areas of the broader network, the master ALTO server generates master network ALTO and cost maps that detail a more complete perspective of available PIDs and inter-PID costs of the broader multi-AS network. The ALTO server may then pass the master ALTO network and cost maps to ALTO clients and/or to federated ALTO servers to improve inter-AS node selection by applications.

The described techniques may present one or more advantages. For example, dynamically generating and updating ALTO network and costs maps with an ALTO server using routing information received from network elements synchronizes the ALTO maps to an ever-changing network environment. As a result, the ALTO network and cost maps provided by the ALTO server to ALTO clients may reflect recent updates to the network topology and/or utilization and may thus improve node selection and increase application performance. Moreover, automatically creating network and cost maps may reduce an ALTO server configuration burden on an operator, making an ALTO server implementation viable in a large-scale service provider environment. Additionally, the techniques may use both intra-AS (intra-domain) and inter-AS (inter-domain) routing information received from network elements, such as Border Gateway Protocol and Interior Gateway Protocol speakers. An ALTO server that implements the techniques may therefore receive and incorporate in ALTO network and costs maps routing information from remote ASes that may not be administratively configurable within the ALTO server.

In one embodiment, the invention is directed to a method comprising executing a routing protocol on an application-layer traffic optimization (ALTO) server to receive layer three (L3) network topology information defining routes to endpoints of a network, and aggregating, with the ALTO server, the endpoints into a set of one or more subsets of topological groupings (PIDs), wherein each PID is associated with a different subset of the endpoints. The method further comprises receiving, with the routing protocol, a topology information advertisement that specifies one or more routes and includes network address information identifying one or more of the endpoints. The method further comprises aggregating, with the ALTO server, the identified endpoints into a first one of the set of PIDs. The method also comprises generating, with the ALTO server, an ALTO network map that includes a PID entry to describe each of the PIDs, and sending the ALTO network map from the ALTO server to an ALTO client.

In another embodiment, the invention is directed to a method comprising executing an interior gateway protocol on an application-layer traffic optimization (ALTO) server, and receiving, with the interior gateway protocol, routing information for an autonomous system that includes the ALTO server. The method also comprises computing, with the ALTO server, an ALTO cost for a pair of a set of one or more subsets of topological groupings (PIDs) of an ALTO network map based at least on the routing information, wherein each one of the set of PIDs is associated with a different subset of endpoints of a network that comprises the autonomous system. The method further comprises generating an ALTO cost map that includes an entry that specifies the ALTO cost between the first member and second member of the pair of PIDs, and sending the ALTO cost map from the ALTO server to an ALTO client.

In another embodiment, the invention is directed to a method comprising receiving a first inter-AS network map and a first inter-AS cost map for a first autonomous system with a master application-layer traffic optimization (ALTO) server, wherein the first inter-AS network map comprises a first set of one or more local and remote subsets of topological groupings (PIDs), wherein each local and remote PID of the first inter-AS network map is associated with a different subset of endpoints of a network, wherein the local PIDs of the first inter-AS network map specify network address prefixes of the first autonomous system and remote PIDs of the first inter-AS network map specify network address prefixes of a second autonomous system, wherein the first inter-AS cost map specifies ALTO costs for pairs of PIDs of the first inter-AS network map. The method also comprises receiving a second inter-AS network map for the second autonomous system with the master ALTO server, wherein the second inter-AS network map comprises a second set of one or more local and remote PIDs, wherein each local and remote PID of the second inter-AS network map is associated with a different subset of the endpoints of the network, wherein the local PIDs of the second inter-AS network map specify network address prefixes of the second autonomous system and remote PIDs of the second inter-AS network map specify network address prefixes of the first autonomous system, wherein the second inter-AS cost map specifies ALTO costs for pairs of PIDs of the second inter-AS network map. The method further comprises generating, with the master ALTO server, a master ALTO network map for the network based at least on the first inter-AS network map and the second inter-AS network map, and outputting the master ALTO network map from the master ALTO server.

In another embodiment, the invention is directed to an application-layer traffic optimization (ALTO) server comprising a control unit having one or more processors and a topology information base. A Border Gateway Protocol (BGP) listener of the control unit that executes a routing protocol to receive layer three (L3) network topology information defining routes to endpoints of a network that includes an autonomous system that includes the ALTO server. A PID generator of the control unit that aggregates the endpoints into a set of one or more subsets of topological groupings (PIDs), wherein each PID is associated with a different subset of the endpoints, wherein the BGP listener receives a topology information advertisement that specifies one or more routes and includes network address information identifying one or more of the endpoints, wherein the BGP listener stores the one or more routes to the topology information base, and wherein the PID generator aggregates the identified endpoints into a first one of the set of PIDs. The ALTO server also includes a network map module of the control unit that generates an ALTO network map that includes a PID entry to describe each of the PIDs, and a client interface that sends the ALTO network map to an ALTO client.

In another embodiment, the invention is directed to an application-layer traffic optimization (ALTO) server comprising a control unit having one or more processors. An interface of the control unit that receives first inter-AS network map and a first inter-AS cost map for a first autonomous system, wherein the first inter-AS network map comprises a first set of one or more local and remote subsets of topological groupings (PIDs), wherein each local and remote PID of the first inter-AS network map is associated with a different subset of endpoints of a network, wherein the local PIDs of the first inter-AS network map specify network address prefixes of the first autonomous system and remote PIDs of the first inter-AS network map specify network address prefixes of a second autonomous system, wherein the first inter-AS cost map specifies ALTO costs for pairs of PIDs of the first inter-AS network map, wherein the interface receives a second inter-AS network map for the second autonomous system, wherein the second inter-AS network map comprises a second set of one or more local and remote PIDs, wherein each local and remote PID of the second inter-AS network map is associated with a different subset of the endpoints of the network, wherein the local PIDs of the second inter-AS network map specify network address prefixes of the second autonomous system and remote PIDs of the second inter-AS network map specify network address prefixes of the first autonomous system, wherein the second inter-AS cost map specifies ALTO costs for pairs of PIDs of the second inter-AS network map. The ALTO server also comprises a network map module of the control unit that generates a master ALTO network map for the network based at least on the first inter-AS network map and the second inter-AS network map, and a client interface of the control unit that sends the master ALTO network map to an ALTO client.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
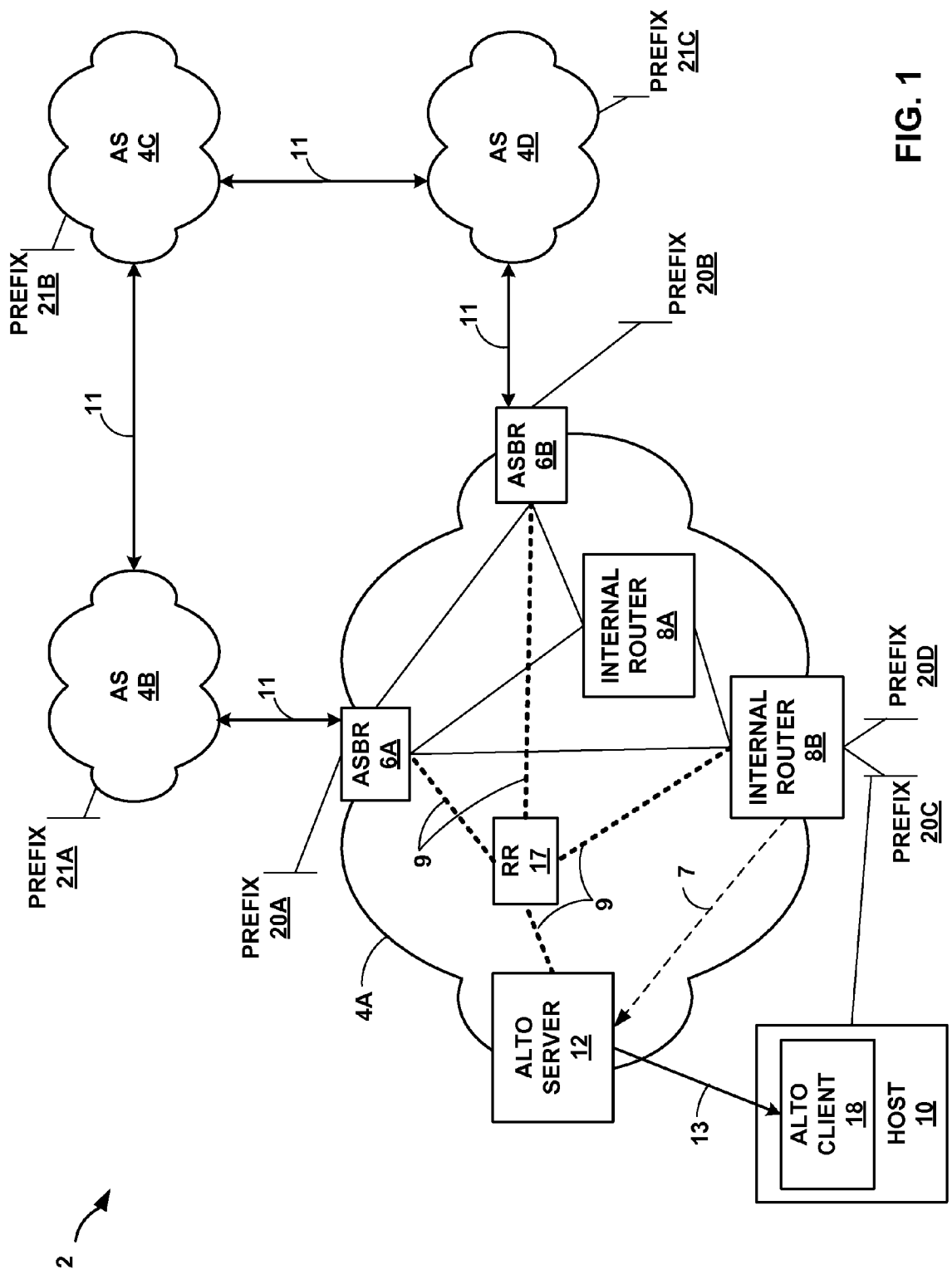
FIG. 1 is a block diagram illustrating an example network that dynamically generates and updates, using advertised routing information, network and cost maps in the manner described herein for use in an Application-Layer Traffic Optimization (ALTO) service.

FIG. 1 is a block diagram illustrating an example network 2 that dynamically generates and updates, using advertised routing information, network and cost maps for use in an Application-Layer Traffic Optimization (ALTO) service. Network 2 comprises autonomous systems 4A-4D (illustrated as "ASes 4A-4D" and collectively referred to herein as "autonomous systems 4") interconnected by external communication links. The term "communication link," as used herein, comprises any form of transport medium, wired or wireless, and can include intermediate nodes such as network devices. Network 2 may in some embodiments represent the Internet or any other publicly accessible computer network, a private network, or a virtual private network (VPN), that transports content for delivery to requesting devices. While described with respect to Internet Protocol networks, the techniques are also applicable to other types of delivery networks, such as Asynchronous Transfer Mode (ATM) networks.

Each of autonomous systems 4 run one or more interior gateway protocols (IGPs), such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP), and each of autonomous systems 4 includes a set of one or more routers operating within a single administrative domain according to a routing policy. Autonomous systems 4 each have an identification number provided by an Internet registry or by an Internet service provider (ISP) that uniquely identifies the autonomous system to other autonomous systems. In some instances, the identification number may be drawn from a private identifier number space and therefore unique only within a private network comprising ASes 4. In various embodiments, each of autonomous systems 4 may represent a service provider network, an enterprise or campus network, a content access network (CAN), or a content delivery network (CDN), for example. In addition, one or more service providers, content provider, or enterprise/campus network administrators may administer any one or more of autonomous systems 4.

Routers of autonomous systems 4 execute an Internet Protocol (e.g., IPv4 or IPv6) to route packets from a source network addresses to destination network addresses, and each of autonomous system 4 offers network packet delivery to a network (or subnet) of one or more endpoints identified by a network address prefix that encompasses the network address range defined by the network addresses of endpoints. For example, AS 4B-4D offer packet delivery to/from respective remote network address prefixes 21A-21C ("remote prefixes 21"), while AS 4A offers packet delivery to/from local network address prefixes 20A-20D ("local prefixes 20"). The terms "remote" and "local" with respect to the prefixes refer to the network perspective of AS 4A, illustrated in greater detail that ASes 4B-4D. The various routers illustrated in autonomous system 4A are interconnected by internal communication links.

An AS that offers packet delivery to a prefix is the "originating domain" for the prefix, also known as the origin AS, and the BGP routing protocol running in all autonomous systems 4 propagates the identification number of the origin AS for the prefix as reachability information for the prefix. As a result, autonomous systems 4 route packets destined for an endpoint having a network address that is within a particular prefix to the origin AS for the prefix. For instance, autonomous systems 4A-4C route packets destined for an endpoint of prefix 21C to AS 4D.

Host 10 accesses AS 4A to issue content requests to, e.g., other hosts or CDN nodes located in any of autonomous systems 4, and to receive application-related content for hosted applications. Host 10 may represent, for example, a workstation, desktop computer, laptop computer, cellular or other mobile device, Personal Digital Assistant (PDA), gaming console, television set-top box, or any other device capable of accessing a computer network via a wireless and/or wired connection. Host 10 has a network address within local prefix 20C and is thus directly served by internal router 8B of AS 4A. In some embodiments, host 10 is a member of a customer network served by AS 4A.

The other devices (not shown in FIG. 1) to which host 10 issues content requests may be served by any of ASs 4A-4D. For example, host 10 may issue a content request to a CDN node having a network address within remote prefix 21B served by AS 4C. As another example, host 10 may issue a content request to an additional host having a network address within local prefix 20A and executing a peer-to-peer (P2P) application for exchanging content among the various hosts, including host 10, which also execute the P2P application.

In the illustrated embodiment, AS 4A includes autonomous system boundary routers 6A-6B ("ASBRs 6") that connect AS 4A to ASes 4B, 4D, respectively, over one of communication links (ASBRs of ASes 4B-4D not shown for ease of illustration). ASBRs 6 execute an exterior gateway protocol (EGP) to exchange, in one of external peering sessions 11 with ASBRs of ASes 4A and 4D, routing information for respective autonomous systems 4. For example, ASBRs 6 provides routing information that describes an internal topology of autonomous system 4A and/or reachability of local prefixes 20. Additionally, ASBRs 6 receive routing information that describes reachability of remote prefixes 21 via ASes 4B-4D. In some instances, ASBRs 6 may receive routing information originated by one of ASes 4B-4D that describes an internal topology of the originating autonomous system.

Routing information for AS 4A outputted by one of ASBRs 6 in a peering session typically includes topology information received from one or more interior routing protocol speakers of autonomous system 4A executing an IGP, such as Internal BGP (iBGP), or received in one of external peering sessions 11 from another one of ASes 4. Topology information may also include administratively configured routes or other information on ASBRs 6. The EGP used for external peering sessions 11 may comprise, for instance, Exterior Border Gateway Protocol (BGP). Each external peering session 11 may comprise a Transmission Control Protocol (TCP) session.

Autonomous system 4A includes reachability protocol speakers that peer with one another to internally advertise topology information, e.g., routes, for local prefixes 20 and remote prefixes 21 to other routers within AS 4A. Reachability protocol speakers of AS 4A include ASBRs 6, route reflector 17, and internal router 8B. ASBRs 6 and internal router 8B each establish a peering session 9 with which to exchange routes with route reflector 17. Route reflector 17 is a reachability protocol speaker that re-advertises (or "reflects") routes received from other gateway protocol speakers to enable the reachability protocol speakers to avoid forming a full mesh of peering sessions 9. However, in embodiments of network 2 that do not include route reflector 17, the reachability protocol speakers may form a full mesh of peering sessions. The reachability protocol with which reachability protocol speakers advertise routes may comprise, for example, the Interior Border Gateway Protocol (IBGP). Topology information advertisements may comprise, for example, route advertisements such as IBGP UPDATE messages. In general, a topology information advertisement associates a prefix with a NEXT_HOP for the prefix and a list of autonomous systems that must be traversed to reach the prefix ("AS_PATH" in IBGP UPDATE messages).

The service provider or other administrator for AS 4A deploys Application-Layer Traffic Optimization (ALTO) server 12 to AS 4A to provide an application-layer traffic optimization service over autonomous systems 4. The application-layer traffic optimization may in some instances conform to the ALTO protocol. In general, the ALTO service enables service and/or content providers to influence the node selection process by applications to further service/content provider objectives, which may include improving a user experience by selecting the most geographically proximate serving node to requesting host 10, reducing transmission costs to the provider, load balancing, service-level discrimination, accounting for bandwidth constraints, decreasing round-trip delay between host 10 and the serving node, and other objectives. Further details regarding the use of an ALTO service in CDNs may be found in R. Penno et al., "ALTO and Content Delivery Networks: draft-penno-alto-cdn-03," Network Working Group, the Internet Engineering Task Force draft, March 2011, which is incorporated herein by reference in its entirety. Furthermore, while generally described with respect to the ALTO service and ALTO servers as described in Seedorf et al., incorporated above, the techniques are applicable to any form of application-layer traffic optimization.

ALTO server 12 generates a network map and cost map for network 2 from the perspective of the ALTO server and provides these maps to ALTO clients in ALTO maps update message 13, such as ALTO client 18 of host 10. A network map contains network location identifiers, or PIDs, that each represents one or more network devices in a network. In general, a PID may represent a single device or device component, a collection of devices such as a network subnet, one of ASes 4, or some other grouping. A cost map contains cost entries for pairs of PIDs represented in the network map and an associated value that represents a cost to traverse a network path between the members of the PID pair. The value can be ordinal (i.e., ranked) or numerical (e.g., actual). ALTO client 18 of host 10 uses the network map and cost map to determine an optimal endpoint for use by an application executing on host 10. For example, host 10 may execute a P2P application that requires particular content from a peer of the P2P network. ALTO client 18 of host 10 determines, from the network map and cost map, to determine an optimal peer from which the P2P application may request and download the content. In some embodiments, host 10 represents a request router that receives content requests from client applications executing on nodes of network 2, determines an optimal server for the requesting clients using the network map and cost map provided by ALTO server 12, and returns a network address or other identifier for the optimal servers to the requesting nodes. In still further embodiments, host 10 executes a client of a client-server application that performs one of the techniques described above. Further details regarding generating network and cost maps for a multi-domain network are found in Penno et al., U.S. patent application Ser. No. 12/861,645, entitled "APPLICATION-LAYER TRAFFIC OPTIMIZATION SERVICE SPANNING MULTIPLE NETWORKS," filed Aug. 23, 2010, the entire contents of which are incorporated herein by reference. Additional details regarding ALTO map updates are found in Raghunath et al., U.S. patent application Ser. No. 12/861,681, entitled "APPLICATION-LAYER TRAFFIC OPTIMIZATION SERVICE MAP UPDATES," filed Aug. 23, 2010, the entire contents of which are incorporated herein by reference.

In some embodiments, ALTO server 12 provides an endpoint cost service. In such embodiments, ALTO client 18 of host 10 (operating as a peer for a P2P application) provides a list of one or more endpoints and an identifier for hosts 10 to ALTO server 12. In response, ALTO server 12 uses network and cost maps generated in accordance with the techniques described herein to determine an optimal endpoint in the list of endpoints received for the receiving host. ALTO server 12 returns the optimal endpoint to ALTO client 18 for use by an application executing on host 10. In some embodiments of ALTO server 12 that implement an endpoint cost service, ALTO server 12 returns a list of the endpoints in a rank ordering according to cost or returns a list of the endpoints with associated costs for each endpoint.

ALTO server 12 may comprise, for example, a high-end server or other service device, a content indexer for a P2P application, or a service card or programmable interface card (PIC) insertable into a network device, such as a router or switch. ALTO server 12 may operate as an element of a service plane of a router to provide ALTO services in accordance with the techniques of this disclosure. Additional details regarding providing ALTO services as an element of a service plane of a router are found in Raghunath et al., incorporated above.

In accordance with the techniques described herein, ALTO server 12 establishes peering session 9, which may comprise an IBGP session, with route reflector 17 of AS 4A. In this way ALTO Server 12 receives, in peering session 9, routing information for AS 4A originated or forwarded by the reachability protocol speakers of AS 4A. In this instance, ALTO server 12 is a passive reachability protocol listener that receives routing information reflected by route reflector 17. That is, in this example, because ALTO server 12 does not (in its capacity as an ALTO server) originate or forward routes, route packets, or perform other such routing functions, ALTO server 12 merely receives routing information. Peering session 9 may comprise a Transmission Control Protocol (TCP) session between route reflector 17 and ALTO server 12. In instances that do not include a route reflector, ALTO server 12 may establish peering session 9 to form a full protocol mesh with each of the reachability protocol speakers, e.g., ASBRs 6 and internal router 8B.

In accordance with the techniques described herein, ALTO server 12 generates an intra-AS ALTO network map for AS 4A using routing information received in peering session 9. An intra-AS network map includes prefixes that constitute or are served by AS 4A (i.e., originated by AS 4A) aggregated by ALTO server 12 into one or PIDs. The intra-AS network map does not include any prefixes originated external to AS 4A.

In some instances, an administrator or other entity may configure reachability protocol speakers, including ASBRs 6 and internal router 8B, to incorporate a prefix attribute into routing information outputted in peering sessions 9. In instances where the reachability protocol is IBGP, the prefix attribute may comprise a BGP Community Attribute or BGP Extended Community Attribute. An AS 4A administrator, or another entity, assigns within the corresponding one of ASBRs 6 and/or internal router 8B, a prefix attribute to one or more prefixes 20 for which the reachability protocol speaker originates or forwards routing information. For each prefix 20 typed in this manner, the reachability protocol speaker adds the prefix attribute to a topology information advertisement that includes topology information that traverses or originates with the respective reachability protocol speaker and that identifies the prefix.

For example, an administrator may configure internal router 8B to incorporate a particular prefix attribute (e.g., "PREFIX_1") into a first topology information advertisement that advertises prefix 20C and into a second topology information advertisement that advertises prefix 20D. As another example, an administrator may configure internal router 8B to incorporate a first particular prefix attribute (e.g., "PREFIX_1") into a first topology information advertisement that advertises prefix 20C and into a second topology information advertisement that advertises prefix 20D. The administrator may additionally configure internal router 8B to incorporate a second particular prefix attribute (e.g., "CDN NODE") into the second topology information advertisement to identify the range of network addresses defined by prefix 20D as including endpoints that are CDN nodes of a CDN. Internal router 8B then generates/modifies and outputs topology information advertisements in accordance with the specified configuration to route reflector 17 in a peering session 9. ALTO server 12 therefore receives topology information advertisements that may include one or more prefix attributes for advertised prefixes 20.

A prefix attribute in a topology information advertisement may comprise a string, bitstring, or integer, for instance. Further details regarding using prefix attributes of topology information advertisements to specify endpoint types in an ALTO context may be found in Medved et al., U.S. patent application Ser. No. 12/982,153, entitled "DYNAMICALLY GENERATING APPLICATION-LAYER TRAFFIC OPTIMIZATION PROTOCOL ENDPOINT ATTRIBUTES," filed Dec. 30, 2010, the entire contents of which are incorporated by reference herein.

ALTO server 12 includes one or more network map policies that specify PID aggregation or PID attributes for topology information received in topology information advertisements in a peering session 9. For example, the network map policies may define mappings of prefix attributes incorporated within topology information advertisements to PID attributes. A PID attribute value may be different than the prefix attribute value to which it is mapped. As another example, the network map policies may define mappings of prefix attributes incorporated within topology information advertisements to specified PID identifiers to direct ALTO server 12 to aggregate one or more prefixes tagged with a particular prefix attribute into the specified PID. In some instances, network map policies that specify PID aggregation may include additional information that defines a cost between PIDs. The specified cost may comprise a constant value or a formula for computing a cost based on one or more parameters.

When ALTO server 12 receives topology information advertisements, the ALTO server dynamically generates or modifies an intra-AS network map in accordance with the network map policies described above. In one example implementation, ALTO server 12 generates and/or updates PIDs of an intra-AS network map according to the following rules that reference the network map policies. First, if the advertised prefix originates from outside of AS 4A, ALTO server 12 ignores the advertised prefix.

For an advertised prefix that originates with AS 4A, if the topology information advertisement that carries the prefix includes a prefix attribute that maps to a specified PID within an ALTO map policy, then ALTO server 12 adds the prefix to the specified PID in the network map.

If a prefix attribute is not specified in any of the network map policies of ALTO server 12, the ALTO server creates/modifies a PID having various prefixes associated with the same NEXT_HOP attribute in topology information advertisements for the prefixes. In some instances, ALTO server 12 may receive from multiple reachability protocol speakers different topology information advertisements for a particular prefix that each specifies a different NEXT_HOP attribute for the prefix. In such instances, ALTO server 12 first selects one of the advertisements (e.g., one of the routes) according to a decision process, such as the BGP decision process described in Rekhter et al., "A Border Gateway Protocol 4 (BGP-4)," Request for Comments 4271, January, 2006, section 9.1 of which is incorporated by reference herein. In some instances, route reflector 17 performs the decision process prior to providing topology information advertisements in peering session 9 to ALTO server 12. The ALTO server 12 then uses the NEXT_HOP attribute for the selected topology information advertisement to aggregate the prefix therein with other prefixes also associated with the same NEXT_HOP attribute in respective topology information advertisements (provided the advertisements do not include a prefix attribute specified in a network map policy). In this way, ALTO server 12 groups the prefixes according to the next hop router for the prefixes when network map policies of the ALTO server do not associate the prefixes to a PID or PID attribute.

For received topology information advertisements that do not fit any of the above categories yet originate with AS 4A and include one or more prefix attributes that map to one or more PID attributes in a network map policy, ALTO server 12 aggregates into PIDs advertised prefixes associated in the advertisements with the same set of prefix attributes and also with the same NEXT_HOP attribute. According to this rule, ALTO server 12 may group into separate PIDs nodes that are both topologically proximate and that also exhibit similar functionality (e.g., CDN nodes attached to AS 4A at the same NEXT_HOP). In some instances, ALTO server 12 may perform the decision process described above to select one of multiple topology information advertisements for use in network map generation/modification. In some instances, however, route reflector 17 performs the decision process prior to providing topology information advertisements in peering session 9 to ALTO server 12. In some instances, ALTO server 12 may receive overlapping routes, as described in Rekhter et al., incorporated above. In such instances, ALTO server 12 may append the advertised prefix to multiple PIDs, which is permitted according to Alimi et al., incorporated above.

In addition to the dynamic PID aggregation process, ALTO server 12 dynamically assigns PID attributes to PIDs of the intra-AS network map according to network map policies that define mappings of prefix attributes incorporated within topology information advertisements to PID attributes. ALTO server 12 also specifies for each PID in the intra-AS network map, as a PID attribute, the NEXT_HOP for the PID prefixes.

Application of the above rules by ALTO server 12 to topology information advertisements produces an intra-AS network map that reflects a current topology of AS 4A. That is, the intra-AS network generated/updated by the ALTO server 12 includes PIDs dynamically aggregated and PID attributes dynamically assigned in accordance with the techniques described above. ALTO server 12 provides the intra-AS network map to ALTO client 18 in ALTO maps update message 13 for use by host 10 in node selection.

Routers of AS 4A, including ASBRs 6 and internal routers 8A-8B, execute an interior gateway protocol (IGP) to disseminate routing information that allows the routers to select routes between any two nodes on a computer network. One type of routing protocol, referred to as a link state protocol, allows routers to exchange and accumulate link state information, i.e., information describing the various communication links that interconnect routers within the AS 4A. With a typical the link state routing protocol, the routers exchange information related to available interfaces, metrics and other variables associated with network links. This allows a router to construct its own topology or map of the network. Metrics may include, for example, latency, link throughput, link availability and reliability, path length, load, and communication cost (i.e., price). These metrics are typically expressed as simple integers.

Link state protocols include OSPF and IS-IS. Through application of the link state protocol, the routers exchange link information with other adjacent routers via link state advertisements (LSAs). A router generating an LSA typically floods the LSA throughout the network such that every other router receives the LSA. In this way, the receiving routers may construct and maintain their own network topologies in a routing table (e.g., a link-state database (LSDB)) using the link information exchanged via the LSAs.

Another type of routing protocol, referred to as a distance vector routing protocol, allows routers to exchange "vectors" of routing information that include, in each vector, a distance and direction. The distance refers to a metric, while the direction specifies a next hop router for the route advertised by the vector. In general, each router learns routes from neighboring routers and advertises routes from its own perspective. Distance vector protocols include, for example, Routing Information Protocol (RIP), Interior Gateway Routing Protocol (IGRP), and Enhanced IGRP (EIGRP).

ALTO server 12 operates as a passive IGP listener by peering with internal router 8B in IGP peering session 7. That is, ALTO server 12 receives routing information from internal router 8B in IGP peering session 7 but does not originate or forward routing information, because ALTO server 12 does not route packets (in its capacity as an ALTO server). In some instances, internal router 8B may set an overload (OL) bit in link-state advertisements (LSAs) to ALTO server 12 to prevent the ALTO server from returning routing information to internal router 8B.

IGP peering session 7 may represent, for example, an OSPF neighbor relationship (or "adjacency") or may simply represent movement of current routing information from internal router 8B to ALTO server 12. In various configurations, ALTO server 12 may peer with other routers of AS 4A in addition, or alternatively, to internal router 8B.

If routers of AS 4A execute a single-area OSPF (that is, if AS 4A is a single-area OSPF network), ALTO server 12 may peer with any router of AS 4A that executes OSPF to obtain the required routing information. Similarly, if routes of AS 4A execute Level 2 IS-IS, ALTO server 12 may peer with any router of AS 4A that executes IS-IS to obtain the required routing information.

In some instances, AS 4A may comprise a multi-area OSPF network. In such instances, ALTO server 12 establishes IGP peering session 7 with at least one backbone (i.e., area 0) router to receive high-level routing information that describes links between the backbone and backbone routers having at least one interface connected to the backbone. ALTO server 12 may use the high-level routing information alone to estimate IGP metrics between next hops of PID pairs, where a next hop of a PID is a router that is a next hop for prefixes of the PID. PID next hops may be specified in ALTO network maps as next hop attributes of PID entries. ALTO server 12 may establish additional IGP peering sessions with other IGP routers in one or more non-backbone areas to receive lower-level routing information for links encompassed by the respective non-backbone area. The ALTO server 12 may then use a combination of high-level and lower-level routing information to compute IGP metrics between next hops of PID pairs. Each IGP peering session between ALTO server 12 and an IGP router in a non-backbone area may comprise a virtual link such as, for example, a Generic Routing Encapsulation (GRE) tunnel.

In some instances, AS 4A may comprise a Level 1/Level 2 IS-IS network. In these instances, ALTO server 12 establishes IGP peering session 7 with at least one Level 2 router to receive high-level routing information that describes links between the backbone and backbone routers having at least one interface connected to the backbone. ALTO server 12 may use the high-level routing information alone to estimate IGP metrics between next hops of PID pairs. ALTO server 12 may establish additional IGP peering sessions with other IGP routers in one or more Level 1 areas to receive lower-level routing information for links encompassed by the respective Level 1 area. The ALTO server 12 may then use a combination of high-level and lower-level routing information to compute IGP metrics between next hops of PID pairs. Each IGP peering session between ALTO server 12 and an IGP router in a non-backbone area may comprise a virtual link such as, for example, a Generic Routing Encapsulation (GRE) tunnel. In this instance, the remote Level 1 or Level 2 router supports configuration of an IS-IS adjacency over a GRE tunnel interface.

In some instances, ALTO server 12 receives, in peering session 9 with route reflector 17, traffic engineering data distributed by BGP speakers of AS 4A and/or ASes 4B-4D. The traffic engineering data may include link attributes such as local/remote IP addresses, local/remote interface indices, metrics, link bandwidth, reservable bandwidth, per CoS class reservation state, preemption and Shared Risk Link Groups (SRLG). The traffic engineering data may be encoded within BGP advertisements from the BGP speakers. Further details regarding exchanging traffic engineering data using BGP are described in U.S. Provisional Patent Appl. No. 61/449,499, incorporated above. In these instances, ALTO server 12 receives topology and routing information, including reachability and link information for links connecting autonomous systems 4 router pairs, from BGP speakers in other IGP areas and may therefore avoid IGP peering with internal router 8B to receive IGP information for AS 4A. In this way, ALTO server 12 may have a unified interface to AS 4A and the broader network encompassing ASes 4.

Upon receiving routing information, ALTO server 12 uses the information to computes routes and calculates costs between different next hop pairs of AS 4A, then assigns these costs as ALTO costs to PID pairs of the intra-AS network map that have respective next hop attributes that correspond to the next hop pairs. In other words, for each PID pair of the intra-AS network map, comprised of a first PID having a first next hop and a second PID having a second next hop, ALTO server 12 uses received routing information to compute a route between the routers referred to by the first and second next hop values (e.g., IP addresses), computes a path cost for the route using link metrics (or distances), and assigns a function of the path cost as an ALTO cost for the PID pair. The ALTO cost for a PID pair represents a cost to traverse AS 4A from the next hop of the first PID of the PID pair to the next hop of the second PID of the PID pair. ALTO server 12 may calculate separate costs to traverse AS 4A from the first PID to the second PID (i.e., "forward metric") and from the second PID to the first PID (i.e., "backward metric").

For example, ALTO server 12 may receive a current LSDB from internal router 8B executing a link state routing protocol, apply a shortest path first (SPF) algorithm to the LSDB to compute a shortest path tree for a PID of the intra-AS network map, and use path costs associated with the branches of the shortest path trees to calculate ALTO costs between the PID and other PIDs of the intra-AS network map. As another example, ALTO server 12 may build a routing table using routing information obtained from internal router 8B by operating as a passive listener of a distance vector protocol. The ALTO server 12 uses the routes and distances specified in the routing table to calculate ALTO costs between the PID and other PIDs of the intra-AS network map.

ALTO server 12 may include one or more ALTO cost policies that define formulas for calculating ALTO cost values for a particular metric. Such policies may incorporate other parameters, in addition to the IGP metric, into the formulas. For example, ALTO server 12 may receive traffic engineering parameters as configuration data or within extended LSAs of OSPF, for instance. For example, ALTO server 12 may receive path costs that represent traffic engineering parameters encoded as Network Layer Reachability Information (NLRI) attributes of a BGP UPDATE message. In general, routers use traffic engineering parameters to create the traffic engineering database, which is used by Constrained Shortest Path First (CSPF) to compute Multi-Protocol Label Switching (MPLS) Label Switched Paths (LSPs). ALTO cost policies may specify incorporating information within the traffic engineering database regarding various links and paths interconnecting routers of AS 4A when computing ALTO costs for PID pairs of the intra-AS network map. Other parameters for AS 4A incorporated by ALTO server 12 may include link delays or load on router interfaces for routers of AS 4A. Some parameters may be received from sources external to AS 4A, such as application or other content servers attached to AS 4A in one of prefixes 20. These parameters may include load and response times for the servers, for instance.

ALTO server 12 assembles the calculated ALTO cost values into an intra-AS cost map for AS 4A. The intra-AS cost map defines inter-PID routing costs for connections among the various PIDs of the intra-AS network map. ALTO server 12 then provides the intra-AS cost map to ALTO client 18 in ALTO maps update message 13. Using the intra-AS network map and cost map provided by the ALTO server, application clients and content request routers (e.g., executing on host 10) select serving resources to minimize costs, as specified by the ALTO maps, between content requesting clients and available resources of AS 4A.

In some instances, ALTO server 12 may generate different costs for multiple cost maps that reflect a particular service provider objective. For example, ALTO server 12 may generate a first intra-AS cost map that specifies ALTO costs calculated by the ALTO server to minimize delay. Such a cost map may improve the performance of voice applications, for example, when provided to ALTO client 18 of host 10. ALTO server 12 may generate second intra-AS cost map that specifies ALTO costs calculated by the ALTO server to maximize bandwidth. This cost map may improve performance of video or other high-bandwidth applications.

In some embodiments, ALTO server 12 additionally generates ALTO network and cost maps that incorporate additional elements of network 2 beyond AS 4A. ALTO server 12 generates these "inter-AS" network and cost maps from the perspective of AS 4A, for that autonomous system encompasses ALTO server 12, and routing information known to ASBRs 6 of AS 4A may become known to ALTO server 12. As stated previously, network 2 may represent the Internet. In contrast to intra-AS network and cost maps, which may include a detailed rendering of application-relevant topology and costs within AS 4A, inter-AS network maps may not include all Internet prefixes, and the division of such prefixes that are included into PIDs may be coarse-grained. Further, inter-AS cost maps may be sparse due to limited external routing information available to AS 4A. As with intra-AS cost maps, ALTO server 12 may generate different costs for multiple inter-AS cost maps that reflect a particular service provider objective.

ASBRs 6 execute an exterior gateway protocol (e.g., BGP) to exchange, in one of external peering sessions 11 with ASBRs of ASes 4A and 4D, routing information for respective autonomous systems 4. The exterior gateway protocol is hereinafter described with respect to exterior BGP (BGP). ASBRs 6 thus receive topology information advertisements in the form of BGP UPDATE messages from ASBRs of ASes 4A and 4D that include routes to prefixes 21. A BGP UPDATE message associates one of prefixes 21 with a NEXT_HOP for the prefix and a list of autonomous systems that must be traversed to reach the prefix (the AS_PATH). The AS_PATH and identifiers for prefixes 21 may be expressed within BGP UPDATE messages within Network Layer Reachability Information (NLRI). ASBRs 6 redistribute routing information received in BGP UPDATE messages to an IGP via peering sessions 9. As stated above, the IGP may comprise IBGP and in such instances peering sessions 9 comprise IBGP peering sessions. In the illustrated embodiment, route reflector 17 re-advertises the routing information to ALTO server 12. As a result of internal distribution of externally originated routing information by IGP routers of AS 4A, ALTO server 12 receives the routing information that includes routes to prefixes 21 of ASes 4B-4D. ALTO server 12 may also be administratively configured with routing information, such as routes to prefixes 21, as well as metrics for inter-AS links (e.g., a cost for a communication link that links AS 4B to AS 4C, or a default cost for all inter-AS links). ALTO server 12 may comprise a routing table with which to store routing information.

In some instances, ASBRs 6 receive traffic engineering data advertised by BGP speakers of ASes 4B-4D and encoded with BGP messages. ASBRs 6 provide these messages to route reflector 17, which re-advertises the traffic engineering data to ALTO server 12. As a result, ALTO server 12 may receive respective intra-AS and/or inter-AS routing and topology information for ASes 4B-4D.

ALTO server 12 uses current intra-AS and inter-AS routing information received in a peering session 9 (or administratively configured) to generate/update an inter-AS network map for network 2. In some instances, ALTO server 12 generates/updates the inter-AS network map by first determining an optimal route for prefixes 20, 21 for which the ALTO server 12 is aware. For local prefixes 20, ALTO server 12 performs the techniques described above for generating inter-AS network and cost maps. As a result, an inter-AS network map generated by ALTO server 12 may comprise the substance of an intra-AS network map for AS 4A generated as in the manner described above.

To aggregate prefixes 21 originated in remote ASes 4B-4D into PIDs, ALTO server 12 aggregates into a separate PID all prefixes 21 that have, according to the routing information, the same AS_PATH attribute and NEXT_HOP attribute. In other words, ALTO server 12 aggregates into a separate PID any prefixes 21 that are reachable by the same route (AS_PATH) and are also advertised within AS 4A by the same one of ASBRs 6 (NEXT_HOP). In the example embodiment, ALTO server 12 assigns each of prefixes 21 to a separate PID, because each of the prefixes have a different AS_PATH. In various embodiments, however, multiple different prefixes advertised in separate topology advertisements may be assigned to the same PID according to the above aggregation rules. ALTO server 12 assembles the PIDs into an inter-AS network map for network 2.

Dynamically generating an inter-AS cost map for network 2 from the perspective of AS 4A (and ALTO server 12) may require inter-AS costs, i.e., a cost between PIDs with prefixes located in different ones of ASes 4. ALTO server 12 may be configured with a policy or other configuration data with inter-AS costs. In some embodiments, the inter-AS cost applied by ALTO server 12 is identical for all pairs of ASes 4. In other words, the inter-AS cost is a default inter-AS cost. In some embodiments, however, ALTO server 12 may include specific inter-AS costs for one or more pairs of ASes 4. For example, ALTO server 12 may be configured with a value for an inter-AS cost between ASes 4B and 4C.

A cost between two remote PIDs (e.g., between a PID in AS 4B and a PID in AS 4C) is deemed proportional to the number of inter-AS links between the two remote PIDs when the inter-AS cost is a default value that is larger than the largest intra-AS cost. To determine the number of inter-AS links between the two remote PIDs, ALTO server 12 reads the AS_PATH attribute of the two remote PIDs. The final autonomous system identification number in the AS_PATH attribute value for a PID is the autonomous system that serves the PID (i.e., the autonomous system that originates advertisements for prefixes encompassed by the PID). For example, from the perspective of AS 4A, an AS_PATH for a PID including prefix 21B comprises [(Identification number for AS 4B), (Identification number for AS 4C)].

If the AS_PATH attribute for either of the two remote PIDs includes the identification number for the autonomous system that serves the other remote PID, ALTO server 12 computes the inter-AS cost as the product of the default inter-AS cost (C) and the number of inter-AS links, according to the AS_PATH attribute, that must be traversed to reach the PID from the other remote PID. In the above example, according to the AS_PATH attribute for the PID comprising prefix 21B of AS 4C, a PID comprising prefix 21A of AS 4B traverses one inter-AS link to reach the PID comprising prefix 21B. The inter-AS cost between the two PIDs is therefore equal to 1×C.

ALTO server 12 computes costs in this manner between each of the remote PIDs represented in the inter-AS network map and stores the costs into a corresponding inter-AS cost map. In some instances, ALTO server 12 includes a policy or other configured data that specifies actual, rather than default, inter-AS costs between pairs of ASes 4. In such instances, ALTO server 12 may sum the inter-AS costs between pairs of ASes 4 represented in an AS_PATH attribute of a remote PID to compute a total cost between two remote PIDs.

To determine costs between two PIDs each encompassing one or more of local prefixes 20 (i.e., "local" PIDs from the perspective of AS 4A), ALTO server 12 performs the techniques described above for generating intra-AS cost maps and incorporated computed costs for local PID pairs into the inter-AS cost map. As a result, an inter-AS cost map generated by ALTO server 12 may comprise the substance of an intra-AS cost map for AS 4A generated as in the manner described above.

For a mixed local-remote PID pair combination, ALTO server 12 supplements the inter-AS cost from AS 4A to the remote PID with the intra-AS cost from local PID to the NEXT_HOP of the remote PID. In the illustrated embodiment, the NEXT_HOP of the remote PID is one of ASBRs 6. In other words, ALTO server 12 combines the inter-AS cost with the intra-AS (IGP) cost to determine a total cost to traverse a route from the local PID of the PID pair to the remote PID. The inter-AS cost from AS 4A, where ALTO server 12 applies the default inter-AS cost, C, to inter-AS links, is the product of the length of the AS_PATH attribute value (i.e., the number of ASes in the AS_PATH) for the remote PID and C. For example, the inter-AS cost between a local PID and a remote PID comprising prefix 21B is equal to 2×C, for the AS_PATH includes AS 4B, 4C and thus has length two.

ALTO server 12 sums the intra-AS and inter-AS cost to determine a total cost, then add the total cost for the local-remote PID pair to the inter-AS cost map for network 2. In some instances, ALTO server 12 may include ALTO cost policies that define formulas for calculating total cost values based on inter-AS and intra-AS costs. Such policies may incorporate other parameters, in addition to these costs, as described above with respect to using ALTO cost policies in the exclusive intra-AS context.

Dynamically generating and updating ALTO network and costs maps with an ALTO server using routing information received from network elements synchronizes the maps to an ever-changing network environment. As a result, the network and cost maps provided by ALTO server 12 to ALTO client 18 may reflect recent updates to the network topology and/or utilization and may thus improve node selection and increase performance by one or more applications of host 10. Moreover, automatically creating network and cost maps may reduce an ALTO server 12 configuration burden on the administrator of AS 4A, making an ALTO server implementation viable in a large-scale service provider environment. The configuration burden may be, rather, distributed to respective administrators of the various ASes 4. In this way, the administrator "close to" a particular one of subnets 20, 21 can be responsible for the treatment of that subnet by ALTO server 12 and ALTO client 18. Because the respective administrators of remote ASes 4B-4D typically have a fuller knowledge of the configuration of the remote ASes than does the administrator of AS 4A, the techniques may thus improve subsidiarity among network entities and operators that cooperate to facilitate content distribution, thereby relieving configuration pressures on the administrator of ALTO server 12.

Figure 2:
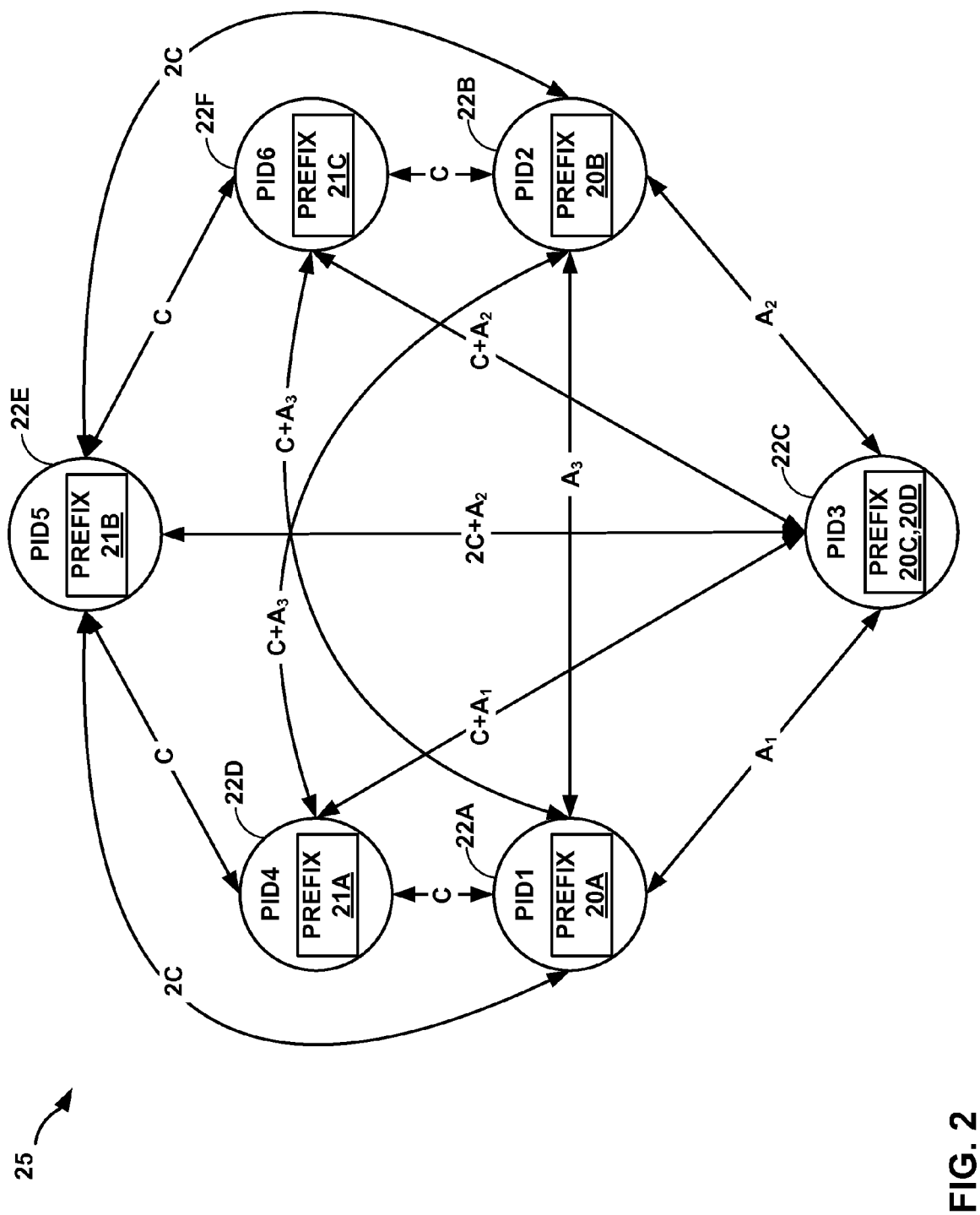
FIG. 2 is a block diagram illustrating an example graph that represents a combined ALTO inter-AS network and cost map that are dynamically generated by an ALTO server for a network according to the described techniques.

FIG. 2 is a block diagram illustrating an example graph 25 that represents a combined ALTO inter-AS network and cost map for network 2 of FIG. 1 that are dynamically generated by ALTO server 12 according to the described techniques. PIDs 22A-22F ("PIDs 22") each encompass one or more prefixes and thus represent the PIDs of an inter-AS network map for network 2. Edges interconnecting PIDs and each annotated with an inter-PID cost represent an inter-AS cost map for network 2.

Performing the techniques described above with respect to FIG. 1, ALTO server 12 aggregates prefix 20A into PID 22A because the next hop for prefix 20A is ASBR 6A. Similarly, ALTO server 12 aggregates both prefixes 20C, 20D into PID 22C because the shared next hop for these prefixes is internal router 8B. Topology advertisements originated by respective ones of ASes 4B-4D include prefixes that are placed by ALTO server 12 into a separate PID. In other words, in this instance, ALTO server 12 aggregates all prefixes served by the same one of ASes 4B-4D into the same PID. For example, PID 22E includes prefix 21B advertised by AS 4C and, in other configurations, would further include any other prefixes advertised by AS 4C.

ALTO server 12 computes intra-AS costs for local PIDs, i.e., PIDs that encompass prefixes 20 served by AS 4A, using routing information received in an IGP session. Graph 25 annotates intra-AS costs on edges using an instance of $A_i$. For example, the intra-AS cost between local PID 22A and local PID 22B is $A_3$. Additionally, ALTO server 12 in this instance uses a default inter-AS cost, C, as the transit routing cost between each pair of neighboring ASes 4. For example, a cost between PID 22D (here aggregating AS 4B) and PID 22E (here aggregating AS 4C) is C because the represented ASes 4B, 4C are neighbors. As another example, a cost between PID 22E and PID 22A (the next hop attribute of which is the next hop to AS 4B, i.e., ASBR 6A) is 2×C.

For a mixed local-remote PID 22 pair combination, ALTO server 12 supplements the inter-AS cost from the next hop of AS 4A to the remote PID with the intra-AS cost from local PID to the NEXT_HOP of the remote PID. In this instance, ALTO server 12 sums the inter-AS cost and intra-AS costs values to compute a total inter-PID cost. For example, a cost, $C+A_1$, between PID 22D and PID 22C is a sum of the cost, C, between PID 22D and PID 22A and the cost, $A_1$, between PID 22A and PID 22C.

Graph 25 does not include an edge to connect PID 22D and PID 22F because ALTO server 12 does not receive routes that include an AS_PATH comprising both AS 4B and AS 4D. ALTO server 12 is therefore unable to determine the costs between remote AS 4B and remote AS 4D.

Figure 3:
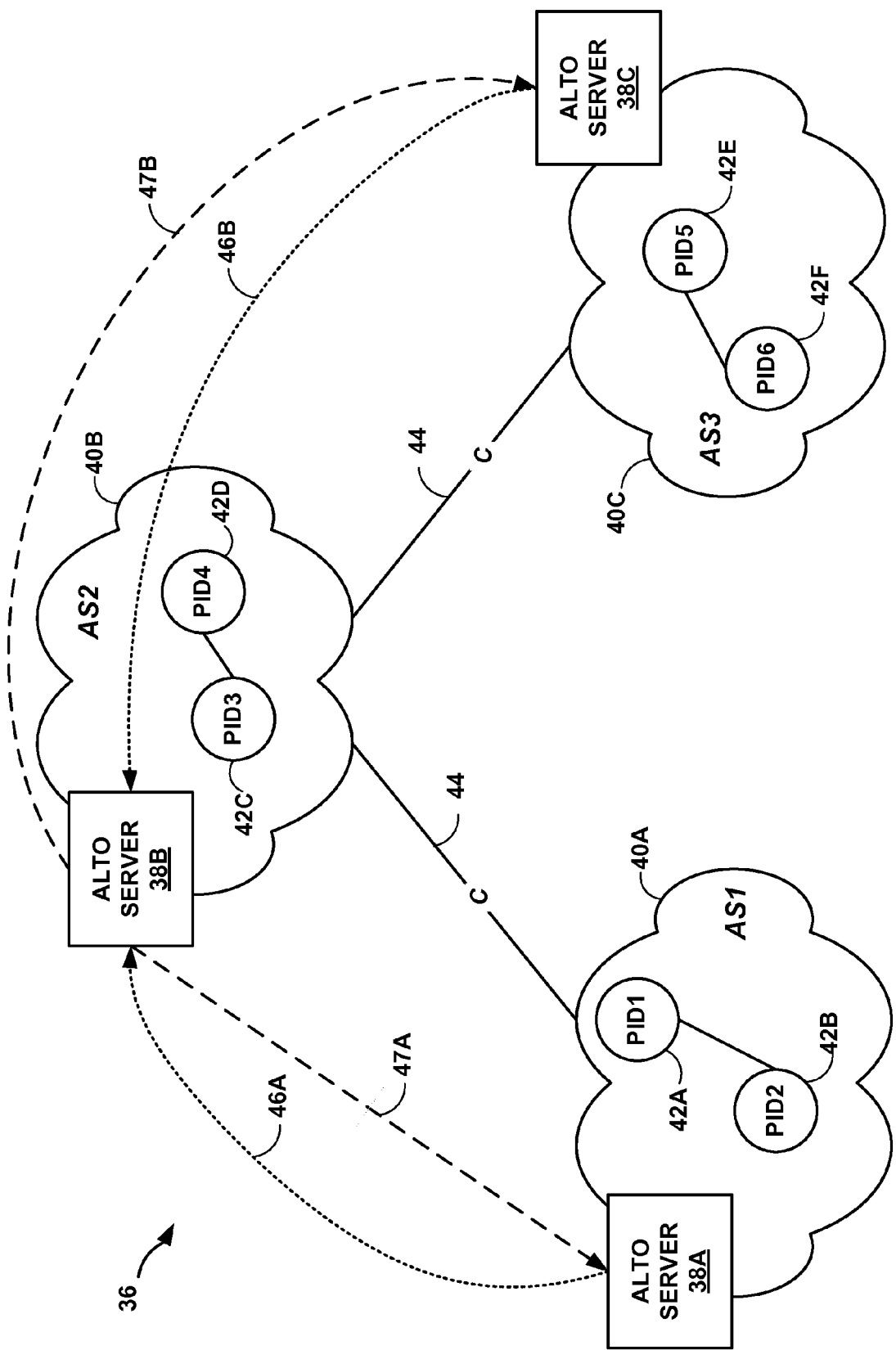
FIG. 3 is a block diagram illustrating a network comprising ALTO servers that perform federated ALTO techniques described herein.

FIG. 3 is a block diagram illustrating network 36 comprising ALTO servers 38A-38C ("ALTO servers 38") that perform federated ALTO techniques described herein. Network 36 includes autonomous systems 40A-40C ("ASes 40") that each includes a respective one of ALTO servers 38. Autonomous systems 40 are interconnected via external communication links 44. Each of ASes 40 may represent an example embodiment of one of autonomous systems 4 of FIG. 1. Each of ALTO servers 38 may represent an example embodiment of ALTO server 12 of FIG. 1. Various combinations of ASes 40 may be under administrative control of one or more administrators or service providers.

Each of ALTO servers 38 performs dynamic network map generation and modification techniques described in this disclosure to aggregate prefixes (not shown in FIG. 3) served by associated ASes 40 into one or more of PIDs 42 and assemble the PIDs into an inter-AS network map and, in some instances, into an intra-AS network map. As illustrated, for example, ALTO server 38A aggregates prefixes served by AS 40A into PIDs 42A, 42B, prefixes of which are connected by an intra-AS communication link. That is, prefixes of PID 42A are connected by an inter-AS communication link to prefixes of PID 42B. Each of ALTO servers 38 additionally performs dynamic cost map generation and modification techniques described herein to produce an inter-AS cost map that includes costs for various combinations of local and remote PIDs associated with the network maps produced by the ALTO server. As a result, each of ALTO servers 38 produces local network and local cost maps that represent a topology of network 36 from the perspective of the associated one of autonomous systems 40 for the ALTO server.

ALTO servers 38 federate with one another in an ALTO federation to share information to foster fine PID prefix granularity throughout network 36 and thereby improve node selection. ALTO server 38B is a master ALTO server that, in addition to its local functions (i.e., generating network and cost maps from the perspective of AS 40B), generates master network and cost maps for network 36 using the various local intra-AS and/or inter-AS network and cost maps generated by each of ALTO servers 38. ALTO server 38B (hereinafter, "master ALTO server 38B") may be administratively configured as a master ALTO server 38B or may be elected during a negotiation between eligible ALTO servers 38. In some configurations, multiple ALTO servers 38 may operate as a master ALTO server.

To enable master ALTO server 38B to determine, within the many network maps master ALTO server 38B generates and receives, the originating one of autonomous systems 40 for each PID in the network maps, ALTO servers 38 add an autonomous system identifier ("AS ID") attribute to PIDs of their respective network maps. The autonomous system identifier may comprise the registered identification number for the originating one of ASes 40 for each of the PIDs (including PIDs 42). In other words, each of PID that encompasses a particular one or more prefixes is "tagged" with an AS ID for the one of ASes 40 that originated the prefixes. Each of ALTO servers 38 may therefore tag PIDs in its network maps with different AS IDs. For example, ALTO server 38A tags PIDs 42A, 42B in the inter-AS network map generated by the ALTO server with an AS ID for AS 40A. In some instances, ALTO server 38A may additionally tag any remote PIDs of the inter-AS network map with AS IDs for the autonomous systems that originated prefixes of the remote PIDs.

Each one of local PIDs 42 in an inter-AS network map thus carries an identity of the one of ASes 40 that includes the one of ALTO servers 38 that generated the PID. Because the local perspective of each prefix included in one of PIDs 42 represents the most precise topological grouping for the prefix, PIDs from the originating one of ASes 40 should be migrated to the master network map. Put another way, by identifying the originating one of ASes 40 for each of PIDs 42, PIDs at the finest level of prefix granularity may be identified and selected by master ALTO server 38B for inclusion in a master network map. ALTO servers 38A, 38C send their respective, inter-AS network and cost maps to ALTO server 38B in respective upload messages 46A, 46B.

In some embodiments, rather than adding an AS ID attribute to each PID in inter-AS network maps, each of ALTO servers 38 generate both intra-AS and inter-AS network maps. ALTO servers 38A, 38C then send their respective, network and cost maps to ALTO server 38B in respective upload messages 46A, 46B. In these embodiments, upload messages 46A, 46B additionally include an AS ID for the one of ASes 40 that includes the sending one of ALTO servers 38A, 38C. For example, ALTO server 38A sends inter-AS and intra-AS network maps, an inter-AS cost map, and an AS ID for AS 40A in upload message 46A to master ALTO server 38B. When master ALTO server 38B receives respective upload message 46A, 46B from one of ALTO servers 38A, 38C in these embodiments, the master ALTO server 38B identifies local PIDs within the inter-AS network map by correlating the prefixes of PIDs within the inter-AS network map to prefixes of PIDs within the intra-AS network map. When a prefix is included within a PID of the intra-AS network map, any PID of the inter-AS network map that also includes the prefix is a local PID. Master ALTO server 38B then tags identified local PIDs with the AS ID received along with the local network maps. This technique may reduce a size of upload messages 46.

ALTO servers 38A, 38C send their respective, local network and cost maps to ALTO server 38B in respective upload messages 46A, 46B. Master ALTO server 38B generates a local network and cost map for AS 40B. Responsive to receiving local network and cost maps, master ALTO server 38B generates the master network and cost map for the ALTO federation of network 36. Master ALTO server 38B may correlate perspectives from each of the local network and cost maps received or generated into a single, consolidated master network and cost map. Master ALTO server 38B then sends the master network and cost maps to ALTO server 38A, 38C in respective download messages 47A, 47B.

Figure 4A:
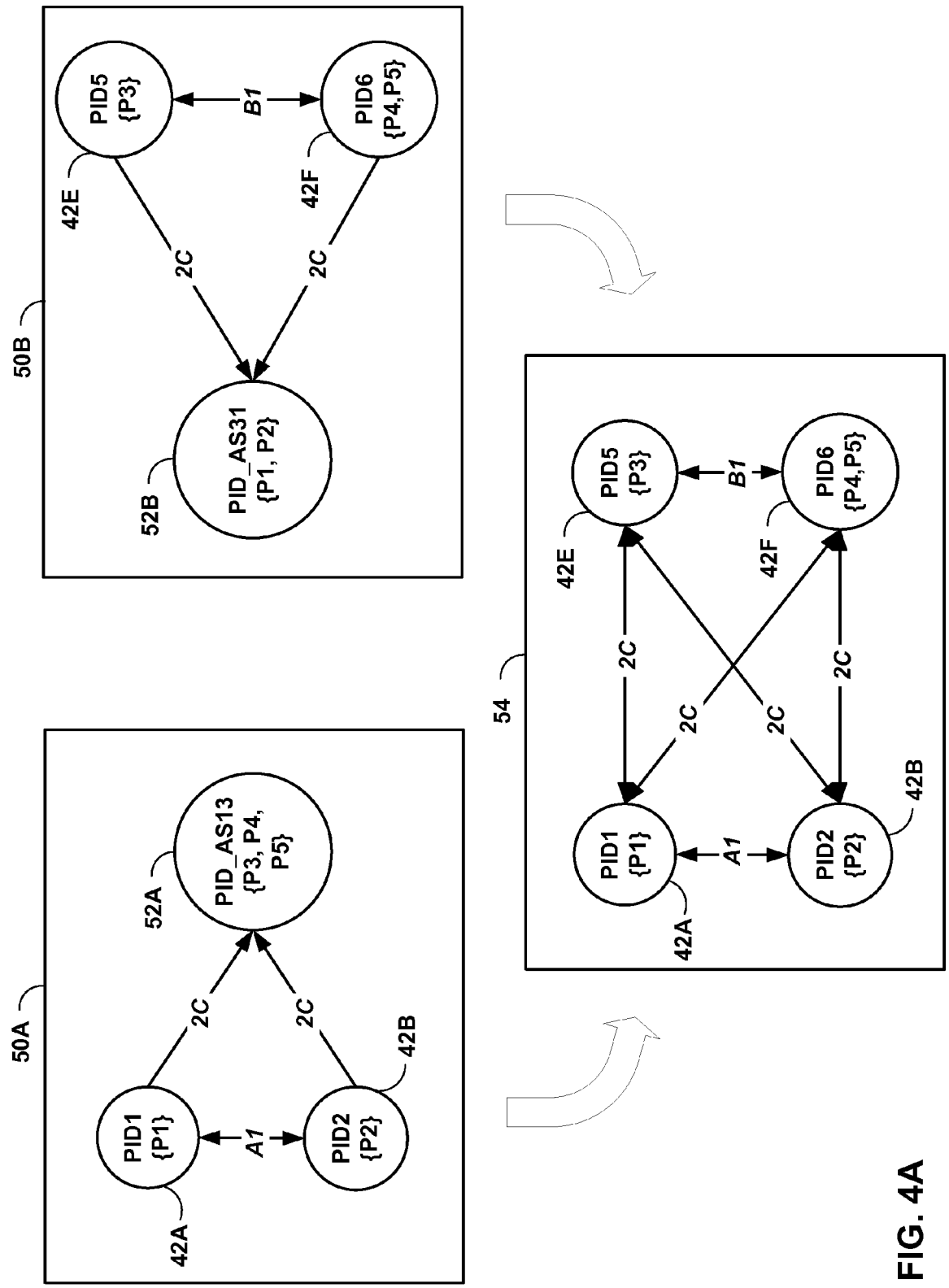
FIGS. 4A-4B are block diagrams illustrating an example graphs that represents a partial combined master network and cost map for a network that is generated by a master ALTO server, in accordance with the described techniques, from multiple partial combined inter-AS network and cost maps for the network as generated by and from the perspective of respective ALTO servers.

FIG. 4A is a block diagram illustrating an example graph 54 that represents a partial combined master network and cost map for network 36 of FIG. 3 that is generated by master ALTO server 38B, according to the described techniques, from graphs 50A, 50B that represent partial combined inter-AS network and cost maps for network 36 generated by and from the perspective of respective ALTO servers 38A, 38C. Graphs 54 and 50A-50B are "partial" in that they do not include elements of AS 40B (for ease of illustration). In some instances, graphs 50A-50B include additional elements to incorporate the elements of AS 40B of FIG. 3. In some instances, graph 54 includes additional elements to incorporate a perspective of ALTO server 38B and/or the elements of AS 40B included in various instances of graphs 50A-50B.

ALTO server 38A generates an inter-AS network map from a perspective of AS 40A that include the elements illustrated in graph 58. Specifically, the inter-AS network map includes local PIDs 42A, 42B. PID 42A has PID identifier "PID1" and encompasses prefix P1. PID 42B has PID identifier "PID2" and encompasses prefix P2. The inter-AS network map additionally includes remote PID 52A that, in this instance, represents an aggregation of prefixes of AS 40C that are advertised to AS 40A in, for example, BGP UPDATE messages. These prefixes include P3, P4, and P5. ALTO server 38A generates an inter-AS cost map that includes cost map entries for the inter-AS network map. Graph 50A illustrates computed inter-PID costs as arrows. For example, a cost from PID 42A to PID 52A is 2C, the cost computed by ALTO server 38A according to the techniques described herein for traversing two inter-AS (or "transit") communication links 44 between AS 40A and AS 40C. ALTO server 38A additionally computes an inter-PID cost, A1, for the PID pair <PID 42A, 42B> using an IGP metric using the techniques of this disclosure.

ALTO server 38C generates an inter-AS network map from a perspective of AS 40C in a similar manner. Although not shown in FIG. 4A, each of PIDs 42A-42B, 42E-42F, and 52A, 52B may include an AS ID for the originating one of ASes 40 for respective, encompassed prefixes. For example, local PID 42E may be tagged with an AS ID for AS 40C in the network map represented by graph 50B. As another example, remote PID 52A may be tagged with an AS ID for AS 40C in the network map represented by graph 50A.

In this example, all prefixes of AS 40C (that is, prefixes P3, P4, and P5) are advertised to AS 40A and aggregated into PID 52A by ALTO server 38A. Similarly, all prefixes of AS 40A (this is, prefixes P1 and P2) are advertised to AS 40C and aggregated in PID 52B by ALTO server 38C.

Master ALTO server 38B receives the inter-AS network and costs maps represented by graphs 50A, 50B from respective ALTO servers 38A, 38C and generates the master network and cost maps represented by graph 54. To generate a master network map from multiple inter-AS network maps, master ALTO server 38B copies all local PIDs of the inter-AS network maps into the master network map. Each of ALTO servers 38 receives the finest granular routing information for its respective one of ASes 40 and therefore has the fullest information base with which to generate local PIDs and compute local inter-PID costs.

Additionally, master ALTO server 38B reconciles each remote PID in each one of the inter-AS network maps with local PIDs in the inter-AS network map for the originating one of ASes 40 that advertises the prefixes of the remote PID. In other words, master ALTO server 38B intersects the prefixes of remote PIDs with prefixes of corresponding local PIDs for the originating (i.e., remote) one of ASes 40 to facilitate the finest available level of PID granularity for the PIDs of the master network map. Considering both a local PID and a remote PID as respective mathematical sets of prefixes, the resulting PIDs for a master network map consist of (1) a PID that includes the relative complement of the remote PID in the local PID (i.e., the set of prefixes in the local PID but not in the remote PID) and (2) the intersection of the remote PID and the local PID (i.e., the set of prefixes in both the remote PID and the local PID). However, if any of these resulting sets of prefixes is null, master ALTO server 38B does not generate a corresponding PID for the null set. Moreover, if any of these resulting sets is already encompassed by a PID of the master network map, master ALTO server 38B may not create a second PID for the same prefix set.

Typically, because ALTO servers 38 generate few remote PIDs for a remote AS, master ALTO server 38B simply copies to the master network map the local PIDs in the inter-AS network map for the originating one of ASes 40 that advertises the prefixes of the remote. In some instances, however, master ALTO server 38B must reallocate prefixes of a local PID of an inter-AS network map into two or more PIDs for inclusion in master network map. Examples of these instances are described in detail below with respect to FIG. 4B.

In the illustrated example, master ALTO server 38B reconciles remote PID 52A of graph 50A with local PIDs 42E-42F of graph 50B. Because PID 52A includes every prefix represented in PIDs 42E-42F, PIDs 42E-42F represent the finest level of granularity for the prefixes, are reachable from each of PIDs 42A-42B with identical costs, and are thus copied by master ALTO server 38B directly to the master network map (represented by PIDs of graph 54).

As an example in the other network traffic direction, master ALTO server 38B reconciles remote PID 52B of graph 50B with local PIDs 42A-42B of graph 50A. PID 52B includes every prefix represented in PIDs 42A-42B and is reachable from each of PIDs 42E-42F at identical cost. Master ALTO server 38B therefore directly copies PIDs 42A-42B to the master network map (represented by PIDs of graph 54).

As seen in graph 64, master ALTO server 38B does not include remote PIDs 52A, 52B in the master network map. Master ALTO server 38B only carries over PIDs for prefixes originated in one of ASes 40 (i.e., local PIDs) into the master network map. In some instances, master ALTO server 38B may modify PID identifiers when copying a local PID into the master network map. For example, PID 42A in both graph 60A and graph 64 has a PID identifier "PID1." In some instances, master ALTO server 38B may provide a network PID identifier for PID 42A in graph 64.

To generate a master cost map from the multiple inter-AS network and cost maps provided by ALTO servers 38, master ALTO server 38B uses inter-PID costs computed from a perspective of an AS from which network traffic will originate. For PID pairs in which both members of the pair are local to a particular one of the inter-AS network maps, master ALTO server 38B uses the inter-PID costs specified in the corresponding inter-AS cost map. In the illustrated example, for instance, master ALTO server 38B sets A1 as a cost between PIDs 42A, 42B of the master network map upon determining A1 as the cost between local PIDs 42A, 42B of the inter-AS network map represented by graph 50A. As in the inter-AS cost map, any PID pair of the master cost map may be associated with two unidirectional costs representing the costs to traverse a network in both directions between the member PIDs of the PID pair.

For PID pairs in which different ASes 40 originate the member PIDs of the PID pair, for each network traffic direction, master ALTO server 38B uses the cost as specified by the one of ALTO servers 38 for the respective one of ASes 40 that originates the traffic. For example, to identify the ALTO cost to traverse the network from PID 42A (including prefix P1 of AS 40A) to PID 42E (including prefix P3 of AS 40C), master ALTO server 38B queries the inter-AS cost map provided by AS 40A to determine the inter-PID ALTO cost between local PID 42A and remote PID 52A (including prefix P3 of AS 40C). This inter-AS cost map is represented in graph 50A, which indicates this inter-PID ALTO cost is 2C. Master ALTO server 38B sets the cost from PID 42A to 42E within the master cost map to 2C.

In the other traffic direction, that is, from PID 42E to PID 42A, master ALTO server 38B queries the inter-AS cost map provided by AS 40C to determine the inter-PID ALTO cost between local PID 42E and remote PID 52B (including prefix P1 of AS 40A). Graph 50B that represents a partial inter-AS cost map provided by AS 40C indicates the cost is 2C. Master ALTO server 38B therefore sets the cost from PID 42E to 42A within the master cost map to 2C.

Graph 54 represents all inter-PID costs as bi-directional arrows for ease of illustration because, in the illustrated embodiment, inter-PID costs in both directions are equal. In some instances, a cost to traverse a network between any two PIDs in one direction differs from the cost to traverse a network between the PIDs in the reverse direction. As a result, the master cost map may include a respective cost entry for each direction for the two PIDs.

Figure 4B:
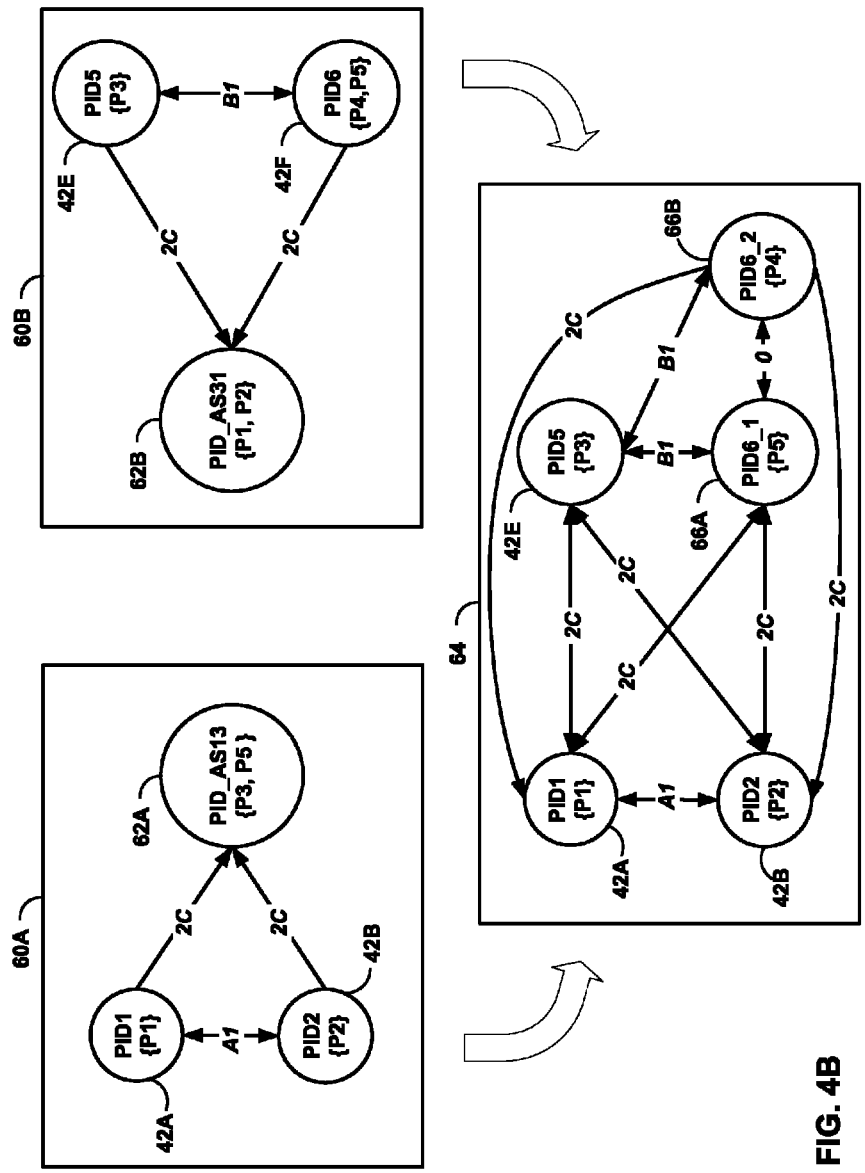

FIG. 4B is a block diagram illustrating variant partial combined network and cost maps of FIG. 4A for an embodiment of network 36 of FIG. 3 in which AS 40C does not advertise prefix P4 to AS 40A. Graph 64 of FIG. 4B represents a partial combined master network and cost map for network 36 that is generated by master ALTO server 38B, according to the described techniques, from graphs 60A, 60B that represent partial combined inter-AS network and cost maps for network 36 generated by and from the perspective of respective ALTO servers 38A, 38C.

In this illustrated embodiment, unlike the embodiment illustrated in FIG. 4A, remote PID 62A of graph 60A does not include prefix P4 because AS 40C does not advertise prefix P4 to AS 40A. Autonomous system 40A comprises ALTO server 38A that generates the partial inter-AS network and cost maps represented by graph 60A.

Because prefix P4 of AS 40C is not advertised and therefore not reachable from AS 40A, master ALTO server 38B allocates prefixes P4, P5 of PID 42F to separate PIDs 66A, 66B for the master network map represented by graph 64. This operation comprises both the intersection and relative complement operations described above with respect to FIG. 4A. That is, master ALTO server 38B creates for the master network map (1) PID 66A encompassing the set of prefixes that is an intersection of the set of prefixes of remote PID 62A of graph 60A and the set of prefixes of local PID 42F of graph 60B (i.e., prefix P5), and (2) PID 66B encompassing the set of prefixes that is a relative complement of the set of prefixes of remote PID 62A of graph 60A in the set of prefixes of local PID 42F of graph 60B (i.e., prefix P4).

Master ALTO server 38B sets costs in the master cost map that accord with the costs of the inter-AS cost maps. Because ALTO server 38C aggregates prefixes P4, P5 into a single PID 42F, the ALTO cost between these prefixes is zero. Master ALTO server 38B therefore sets the ALTO cost between PIDs 66A, 66B that each encompass one of prefixes P4, P5 to zero in the network cost map represented by graph 64. Similarly, the ALTO cost between PIDs 42E, 42F is set to B1 according to graph 60B. Master ALTO server 38B therefore sets the ALTO cost between PIDs 42E, 66A and between PIDs 42E, 66B to B1 in the network cost map represented by graph 64, for PIDs 66A and 66B include reallocated prefixes of PID 44F.

Because there is no available path from prefixes of AS 40A to prefix P4 of AS 40C, the ALTO costs from PIDs 42A, 42B to PID 66B is set to infinity in the master cost map. This is illustrated in graph 64 by the absence of a directional arrow from either of PIDs 42A, 42B to PID 66B. However, because AS 40A prefixes P1, P2 to AS 40C, a directional arrow illustrating cost 2C connects PID 66B to each of PIDs 42A, 42B to represent these costs in the master cost map generated by master ALTO server 38B. Some instances of master ALTO server 38B may set the ALTO cost from PID 66B to each of PIDs 42A, 42B to infinity because most applications require bi-directional communication and that an ALTO client should not therefore select either of PIDs 42A, 42B to serve a client in PID 66B.

Various other embodiments of network 36 of FIG. 3 may require PID prefix reallocation from inter-AS network maps by master ALTO server 38B when generating the master network map for network 36. For example, in some embodiments, two or more remote PIDs of a first inter-AS network map may together encompass two or more prefixes that are aggregated at the originating one of ASes 40 for these prefixes into a single local PID of a second inter-AS network map for the originating AS. This may occur where, for example, traffic engineering parameters specify a different autonomous system path (AS_PATH) for reaching each of the remote PIDs from local PIDs of the first inter-AS network map. In other words, the prefixes in the remote PIDs are associated with different AS_PATH lengths from the autonomous system that includes the one of ALTO servers 38 that generated the first inter-AS network map.

In this instance, master ALTO server 38B reallocates the prefixes of the single local PID of the second inter-AS network map into two or more master network map PIDs that each encompasses a different set of the prefixes, grouped according to similar AS_PATH lengths as specified by the two or more remote PIDs of the first inter-AS network map. In this way, master ALTO server 38B aggregates all prefixes from remote PIDs of the first inter-AS network map that have the same AS_PATH length into the same PID for the master network map. Because the various prefixes are aggregated into a single PID in the second inter-AS network map, the ALTO cost between these prefixes is zero. Master ALTO server 38B therefore sets the ALTO cost between the various pairs of the two or more master network map PIDs generated in this manner to zero. Master ALTO server 38B sets the ALTO cost to the two or more "split" master network map PIDs from the PIDs of the AS of the first inter-AS network map according to the cost specified in the first inter-AS network map to remote PIDs of the first inter-AS network map that include prefixes of the "split" master network map PIDs from the PIDs of the AS.

As another example, two or more remote PIDs of a first inter-AS network map may together encompass two or more prefixes that are aggregated at a neighboring, originating one of ASes 40 into a single local PID of a second inter-AS network map for the neighboring, originating AS. As described in further detail below with respect to FIG. 5, this may occur where, for example, the ALTO server 38 that generates the first inter-AS network map receives routing information that specifies different paths from local PIDs of the first inter-AS network map to the prefixes of the neighboring AS due to multiple ASBRs connecting the AS of the first inter-AS network map to the neighboring AS.

In this instance, master ALTO server 38B reallocates the prefixes of the single local PID of the second inter-AS network map into two or more master network map PIDs that each encompasses a different set of the prefixes, grouped according to reachability from the AS of the first inter-AS network map by respective ones of the different paths. In this way, master ALTO server 38B aggregates all prefixes from remote PIDs of the first inter-AS network map that have a same cost from the AS of the first inter-AS network map into the same PID for the master network map. Because the various prefixes are aggregated into a single PID in the second inter-AS network map, the ALTO cost between these prefixes is zero. Master ALTO server 38B therefore sets the ALTO cost between the various pairs of the two or more master network map PIDs generated in this manner to zero. Master ALTO server 38B sets the ALTO cost to the two or more "split" master network map PIDs from the PIDs of the AS of the first inter-AS network map according to the cost specified in the first inter-AS network map to remote PIDs of the first inter-AS network map that include prefixes of the "split" master network map PIDs from the PIDs of the AS.

As another example, a remote PID of a first inter-AS network map may encompass a prefix that encompasses sub-prefixes (e.g., subnets) that are aggregated at a neighboring, originating one of ASes 40 into multiple local PIDs of a second inter-AS network map for the neighboring, originating AS. This circumstance may occur due to prefix aggregation, for instance. In this example, the multiple local PIDs of the second inter-AS network map control PID allocation within the master network map.

Figure 5:
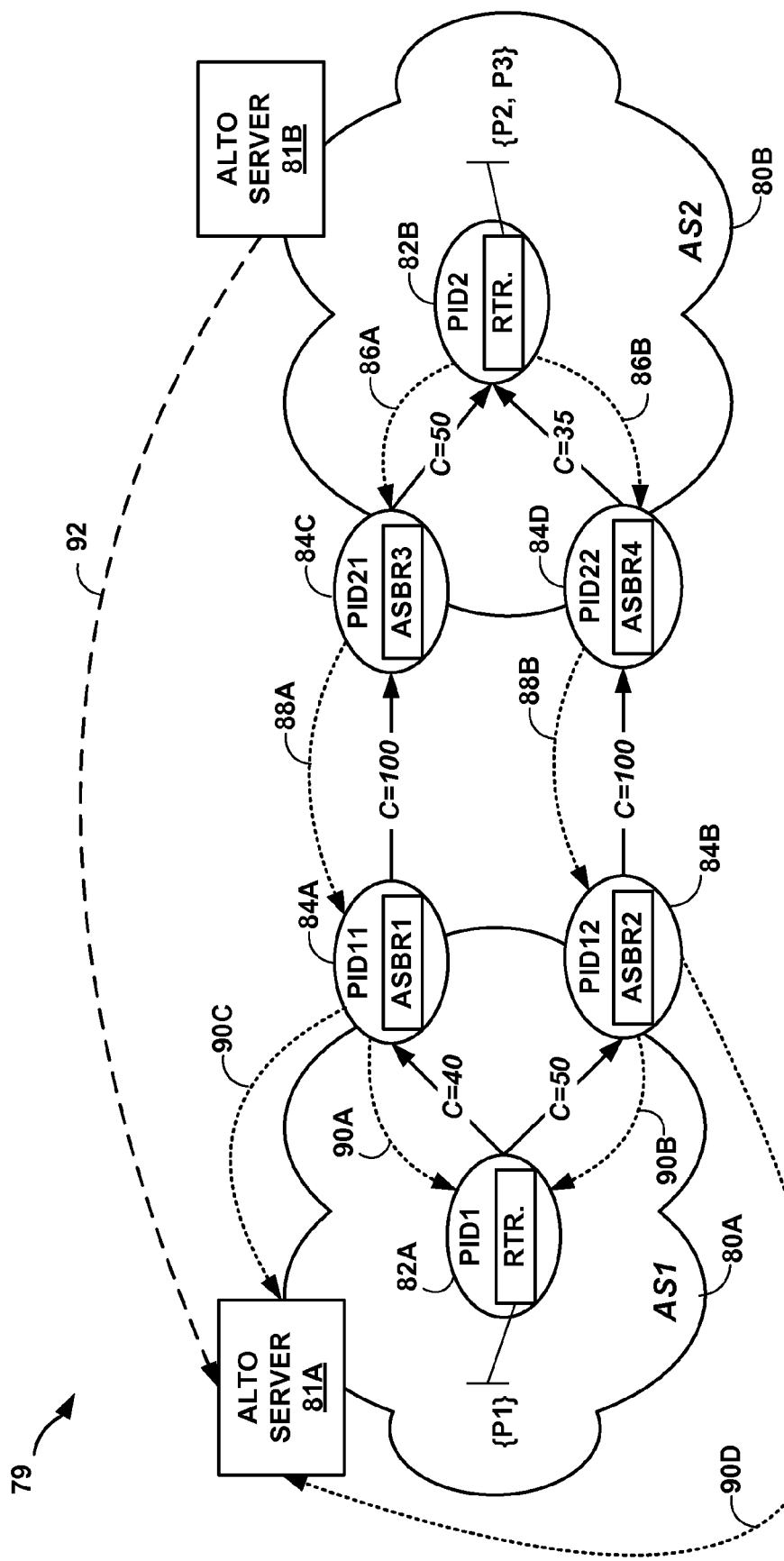
FIG. 5 is a block diagram illustrating an example network comprising ALTO servers that perform federated ALTO techniques for neighboring autonomous systems in the manner described herein.

FIG. 5 is a block diagram illustrating an example network 79 comprising ALTO servers 81A-81B ("ALTO servers 81") that perform federated ALTO techniques described herein. Network 79 includes autonomous systems 80A-80B ("ASes 80") that each includes a respective one of ALTO servers 81. Autonomous systems 80 are interconnected via respective external communication links (not shown) that connect pairs of autonomous system boundary routers of ASes 80. For example, a first external communication link communicatively couples "ASBR2" (encompasses by PID 84B) of AS 80A and "ASBR4" (encompassed by PID 84D) of AS 80B. Each of ASes 80 may represent an example embodiment of one of autonomous systems 4 of FIG. 1. Each of ALTO servers 81 may represent an example embodiment of ALTO server 12 of FIG. 1. Each of ASes 80 may be under administrative control of one or more administrators or service providers. While illustrated as and described as ASBRs, any of the ASBRs may comprise area boundary routers or any external BGP speaker.

Each of ALTO servers 81 performs dynamic network map generation and modification techniques described in this disclosure to aggregate prefixes advertised by routers of associated ASes 80 into one or more of PIDs 82 or PIDs 84 and assemble the PIDs into a respective inter-AS network map for the AS that includes the ALTO server. As illustrated, for example, ALTO server 81A aggregates prefix P1 advertised by an internal router of AS 80A into PID 82A. The internal router of AS 80A may be set as a next hop attribute of PID 82A. ALTO server 81A additionally creates respective PIDs 84A, 84B for prefixes (in this case, network addresses) of each of the ASBRs of AS 80A. ALTO server 81B aggregates prefixes P2, P3 advertised by an internal router of AS 80B into PID 82B. The internal router of AS 80B may be set as a next hop attribute of PID 82B. ALTO server 81B additionally creates respective PIDs 84C, 84D for prefixes (in this case, network addresses) of each of the ASBRs of AS 80B. V The various PIDs 82, 84 of each respective one of ASes 80 are connected by intra-AS communication links. Each of ALTO servers 81 additionally performs dynamic cost map generation and modification techniques described herein to produce an inter-AS cost map that includes costs for various combinations of local and remote PIDs associated with the network maps produced by the ALTO server. As a result, each of ALTO servers 81 produces local network and local cost maps that represent a topology of network 79 from the perspective of the associated one of autonomous systems 80 for the ALTO server.

ALTO servers 81 federate with one another in an ALTO federation to share information to foster fine PID prefix granularity throughout network 79 and thereby improve node selection. ALTO server 81A is a master ALTO server that, in addition to its local functions (i.e., generating network and cost maps from the perspective of AS 80A), generates master network and cost maps for network 79 using the various local intra-AS and/or inter-AS network and cost maps generated by each of ALTO servers 81.

ALTO server 81A receives routing information that advertises prefixes P2, P3 of AS 80B via a chain of topology information advertisements by routers of ASes 80. In one example, the internal router of AS 80B sends an IBGP UPDATE messages 86A, 86B that each includes prefixes P2, P3 to the ASBRs of the AS 80B. The ASBRs of AS 80B reissues the messages as respective BGP UPDATE message 88A, 88B to the ASBRs of AS 80A. The ASBRs, in turn, reissue the BGP UPDATES message 80A, 88B as IBGP UPDATE messages 90A-90D. ALTO server 81A receives IBGP UPDATE message 90C from the ASBR encompassed by PID 84A, which is a next hop for a first route for prefixes P2, P3. ALTO server 81A receives IBGP UPDATE message 90D from the ASBR encompassed by PID 84B, which is a next hop for a second route for prefixes P2, P3. ALTO server 81A also receives routing information for prefix P1 of AS 80A.

ALTO server 81A also receives routing information that specifies link metrics for internal links of AS 80A and uses these metrics to compute ALTO costs from PID 82A to PID 84A and from PID 82A to PID 84B. In addition, ALTO server 81A is configured with inter-AS costs for each connected pair of ASBRs of the ASes 80, which the ALTO server uses to compute ALTO costs from PID 84A to PID 84C and from PID 84B to PID 84D. These ALTO costs are illustrated in FIG. 5 as unidirectional arrows with annotated cost information.

ALTO server 81B receives routing information for prefixes P2, P3 as well as routing information that specifies link metrics for internal links of AS 80A. ALTO server 81B uses the metrics to compute ALTO costs from PID 84C to PID 82B and from PID 84D to PID 82B. In accordance with the techniques of this disclosure, ALTO server 81B then uses the received routing information to generate inter-AS network and cost maps for AS 80B. ALTO server 81B sends the generated inter-AS network and cost maps for AS 80B to ALTO server 81A in upload message 92.

Because multiple network paths from PID 82A to PID 82B exist, ALTO server 81A determines the network path along which the routers of AS 80A will forward traffic to determine an accurate ALTO cost between the PIDs. Using the routing information received from the routers of AS 80A, ALTO server 81A selects one of the routes to prefixes P2, P3 according to a decision process, such as the BGP decision process described in Rekhter et al., referenced above. So long as the policy configuration of ALTO server 81A and the internal router of AS 80A are similar regarding the decision process, the decision process accurately determines the path for traffic from PID 82A toward PID 82B. In some embodiments, rather than perform a decision process, ALTO server 81A accesses the Local Routing Information Base (Loc-RIB) of the internal router of AS 80A that is the next hop for PID 82A. The Loc-RIB specifies the route selected by the internal router. In the illustrated embodiment, the path for traffic runs to PID 84A because of the lower internal routing cost from the internal router of PID 82A to the ASBR of PID 84A.

Having determined the path for traffic from PID 82A to PID 82B, ALTO server 81A sums the various ALTO costs for the path links, which include the link from PID 82A to PID 84A, from PID 84A to PID 84C, and from PID 84C to PID 82B. The ALTO cost for the link from PID 82A to PID 84A is specified by the inter-AS network map generated by ALTO server 81A for AS 80A, as is the ALTO cost for the link from PID 84A to PID 84C. The ALTO cost for the link from PID 84C to PID 82B is specified by the inter-AS network map generated by ALTO server 81B and sent to ALTO server 81A in upload message 92. In this instance, the sum of the various ALTO costs equals 190.

Figure 6A:
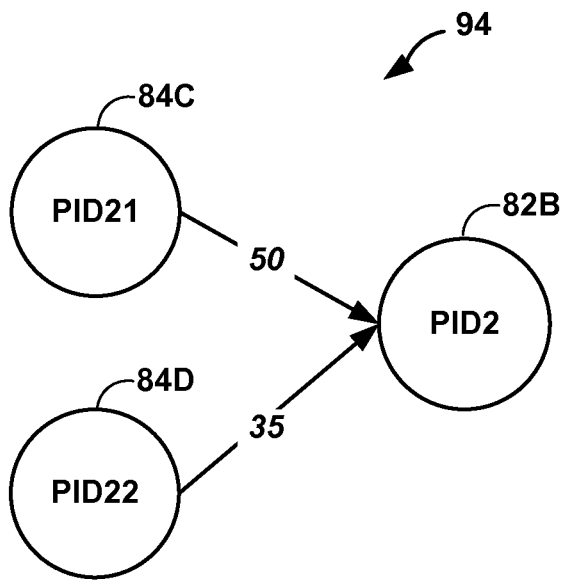
FIG. 6A is a block diagram illustrating an example graph that represents a partial combined intra-AS network and cost map for that is generated by an ALTO server for an autonomous system according to the described techniques.

FIG. 6A is a block diagram illustrating an example graph 94 that represents a partial combined intra-AS network and cost map for AS 80B of FIG. 5 that is generated by ALTO server 81B, according to the described techniques. Graph 94 is partial in that it does not include ALTO costs in both directions. In some embodiments, graph 94 is a combined inter-AS network and cost map that incorporates elements of AS 80A. ALTO server 81B sends the network and cost maps represented by graph 94 to ALTO server 81A.

Figure 6B:
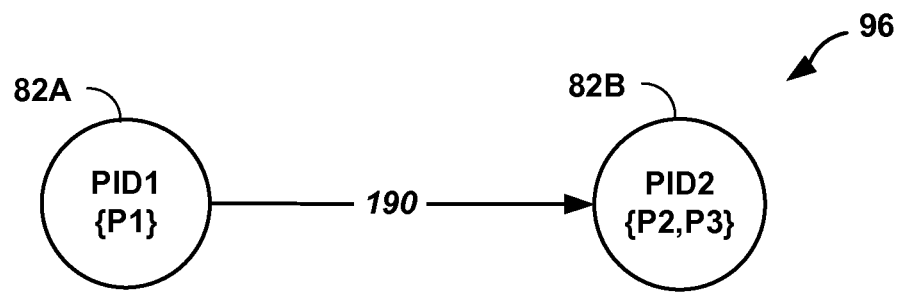
FIG. 6B is a block diagram illustrating an example graph that represents a partial combined master network and cost map generated for a network in accordance with the techniques described herein.

FIG. 6B is a block diagram illustrating an example graph 96 that represents a partial combined master network and cost map for network 79 of FIG. 5. Graph 96 is partial in that it does not include ALTO costs in both directions. ALTO server 81A generates the master network and costs maps for network 79 using received routing information, configured inter-AS costs, and a network and cost map received from ALTO server 81B for AS 80B.

Figure 7:
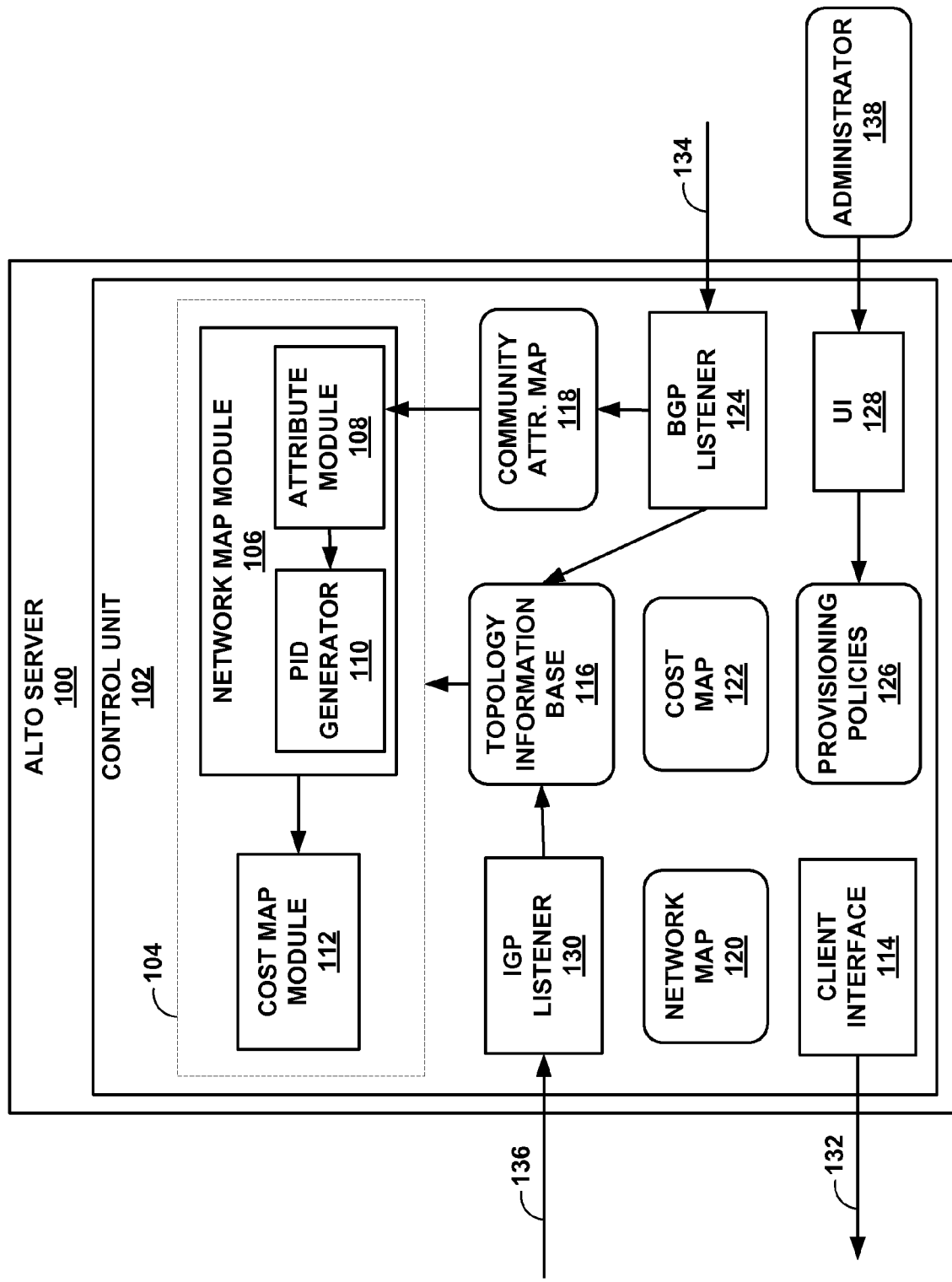
FIG. 7 is a block diagram illustrating, in detail, an example ALTO server that receives routing information and dynamically generates network and cost maps in accordance with the techniques described herein.

FIG. 7 is a block diagram illustrating, in detail, an example ALTO server 100 that receives routing information and dynamically generates network and cost maps in accordance with the techniques described herein. ALTO server 100 may represent an example embodiment of any of ALTO servers 12 of FIG. 1, ALTO servers 38 of FIG. 3, or ALTO servers 81 of FIG. 5. ALTO server 100 may be a server, network controller, network switch, or other computing device or appliance that includes one or more microprocessors that provide an operating environment for one or more software modules for dynamically generating and outputting ALTO network and cost maps in accordance with the described techniques. For purpose of clarity, components, such as a microprocessor, memory, keyboard, display, an operating system, network drivers and other components commonly found in such a computing device or appliance are not shown in FIG. 7. In some embodiments, ALTO server 100 comprises a router that includes one or more services units to apply services such as ALTO services as described herein. The services units may be distributed over one or more service cards or blades (not shown) that are inserted into rack slots of a router. The services units may communicate with the routing plane across a backplane or across a network link that enables the ALTO services to passively peer with routing daemons executing routing protocols within the routing plane of the router comprised by ALTO server 100.

Control unit 102 of ALTO server 100 provides an operating environment for executing network map module 106, cost map module 112, client interface 114, IGP listener 130, BGP listener 124, and user interface 128. Control unit 102 may comprise one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein.

Map modules 104 of ALTO server 100 dynamically generate network map 120 and cost map 122 using routing information received with IGP listener 130 and reachability information, e.g., in the form of topology information advertisements, received with BGP listener 124. In some instances, map modules 104 dynamically generate network map 120 and cost map 122 using routing information and reachability information received with BGP listener 124 in BGP advertisements that include traffic engineering data. In addition, in the illustrated embodiment, ALTO server 100 comprises topology information base 116, a data structure that includes information regarding network topology, transmission costs for various network links, and other information that may be used by map modules 104 to generate ALTO-based maps (i.e., network map 120 and cost map 122). Topology information base 116 may comprise one or more routing information bases (RIBs). Topology information base 116 may further comprise a traffic engineering database. Network map module 106 of map modules 104 uses topology information base 116 and community attribute map 118 (illustrated as "community attr. map 118") to generate network map 120 according to the techniques described herein. Cost map module 112 of map modules 104 may use dynamically generated network map 120 and topology information base 116 to generate cost map 122 according to the techniques described herein. In some instances, network map module 106 additionally generates a master network map for a network using two or more inter-AS network maps, and cost map module 112 generates a master cost map for a network using two or more inter-AS cost maps.

Network map 120 may comprise an intra-AS and/or inter-AS network map dynamically generated in accordance with the described techniques. Network map 120 includes one or more PID entries that comprise a data structure to store a corresponding one or more PIDs of the network map. Each PID entry may include one or more aggregated prefixes, and PID identifier or name, and any attributes for the PID. Cost map 122 may comprise an intra-AS and/or inter-AS cost map dynamically generated according to the described techniques. Cost map 122 may comprise, for example, one or more cost map entries that each specifies two PIDs of network map 120 and an ALTO cost for the two PIDs.

User interface 128 of ALTO server 100 may comprise a command-line interface (CLI), a graphical user interface (GUI), a remote procedure call (RPC), or some other method to enable administrator 138 to configure topology information base 116 and provisioning policies 126 of ALTO server 100. Administrator 138 may be a network operator of, e.g., a service provider network, or a software agent executing, e.g., on a network management device. Administrator 138 provisions ALTO server 100 with provisioning policies 126, a set of policies that cause network map module 106 to generate network map 120 and cost map module 112 to generate cost map 122 in accordance with administrator preferences relating to transmission costs, load balancing, service-discrimination, PID grouping, community attribute to PID identifier mappings, or other preference areas. For example, a policy in provisioning policies 126 may direct cost map module 112 to compute ALTO costs from IGP metrics, stored in topology information base 116, according to a particular formula. As another example, a policy in provisioning policies 126 may direct network map module 106 to aggregate prefixes tagged with a particular community attribute into a particular PID.

BGP listener 124 is a reachability protocol listener that executes BGP to peer with BGP speakers to receive BGP UPDATE messages 134 that include NLRI for installation to topology information base 116. BGP listener 124 may store a Loc-RIB (Local Routing Information Base) and/or an Adj-RIB-In (Adjacent Routing Information Base, Incoming) for each BGP peer of ALTO server 100 (not shown). In addition, administrator 138 may add, modify, or remove routing information from topology information base 116 using UI 128. In some instances, BGP listener 124 receives traffic engineering data encoded within BGP advertisements received from the BGP speakers. BGP listener 124 stores the traffic engineering data to a traffic engineering database (TED) of topology information base 116, which map modules 104 use to dynamically generate network map 120 and cost map 122.

IGP listener 130 is a routing protocol listener that executes an interior gateway protocol to receive routing information 136 from network routers for installation to topology information base 116. In some embodiments, IGP listener 130 executes OSPF to peer with neighboring routers to receive the LSDB and link-state updates for the autonomous system that includes ALTO server 100. In such embodiments, topology information base 116 comprises the LSDB.

Community attribute map 118 (illustrated as "community attr. map 118") is an associative data structure, such as a table, list, or map, that maps community attribute values to corresponding PID attribute values. Community attributes and PID attributes may be derived from different namespaces. For example, a community attribute is typically a four byte integer, while a PID attribute may be a string. Community attribute map 118 operates as a lookup data structure that is keyed to community attribute values. That is, for a community attribute value (e.g., a value that specifies endpoints of type "CDN node"), community attribute map 118 provides a corresponding PID attribute value (e.g., a value that identifies PIDs associated with endpoints of type "CDN node").

PID generator 110 aggregates endpoints described in topology information base 116 into PIDs and performs other PID generation, modification, and "splitting" techniques described in this disclosure. PID generator 110 dynamically aggregates destination prefix received in BGP UPDATE messages 134 into a new PID of network map 120 or modifies an existing PID of network map 120 to incorporate the destination prefix. When individual ones of BGP UPDATE messages 134 include community attributes, attribute module 108 assigns the PID attribute value, mapped by BGP listener 124 using the community attribute value received in BGP UPDATE message 134, to the new or modified PID that includes the destination prefix.

Network map module 106 assembles the aggregated PIDs generated by PID generator 110 into network map 120 according to the techniques described herein. Cost map module 112 applies provisioning policies 126 to network map 120 and, in some instances, topology information base 116 to generate a corresponding cost map 122. PID attributes for PIDs of network map 120 dynamically determined from BGP UPDATE messages 134 may affect determination by cost map module 122 of inter-PID costs. For example, provisioning policies 126 may include a policy requiring cost map module 122 to set to infinity inter-PID costs for PID pairs having PIDs that both include a PID attribute value of "host." In this example, an application using the ALTO service provided by ALTO server 100 that receives a content request from a host endpoint will therefore not select another host endpoint to serve the requested content. The application, in the form of a request router for example, may instead select a CDN node.

Client interface 114 exposes an ALTO server interface to enable ALTO clients to request and receive network and cost maps for an application for the network. Client interface 114 sends a copy of network map 120 and cost map 122 to a requesting client in maps upload message 132. Any update message 132 may comprise an incremental or a complete update, as described in Raghunath et al. incorporated above.

Client interface 114 may execute one or more protocols to obtain network addresses of ALTO clients in the network, and the client interface maintains these network addresses so as to push incremental updates of the maps to the clients. Example interfaces for client interface 114 may include Simple Object Access Protocol (SOAP) or other eXtensible Markup Language (XML) interfaces, a CLI or GUI, Simple Network Management Protocol (SNMP), Remote Procedure Calls (RPCs), and a Common Object Request Broker Architecture (CORBA) interface, for example.

In some embodiments of ALTO server 100, client interface 114 implements an endpoint cost service. When client interface 114 receives, from a client, a list of endpoints represented in network map 120, client interface 114 returns an ordinally ranked list of the endpoints or the costs, specified by cost map 122, between the endpoints and the client or between the endpoints and another specified source node. Alternatively, client interface 114 returns costs between each of the endpoints and the client or between each of the endpoint and another specified source node.

In some instances, ALTO server 100 may operate as a master ALTO server and generate master network and cost maps for a network. In these instances, client interface 114 operates to communicate between ALTO server 100 and various other ALTO servers located within other autonomous systems of the network. Client interface 114 receives network and cost maps from these various other ALTO servers. Upon consolidation of these network and cost maps by map modules 104 into a master network and cost map, client interface 114 sends the master network and cost maps to the various other ALTO servers to provide a high-resolution network topology and cost information to other areas of the network.

Figure 8:
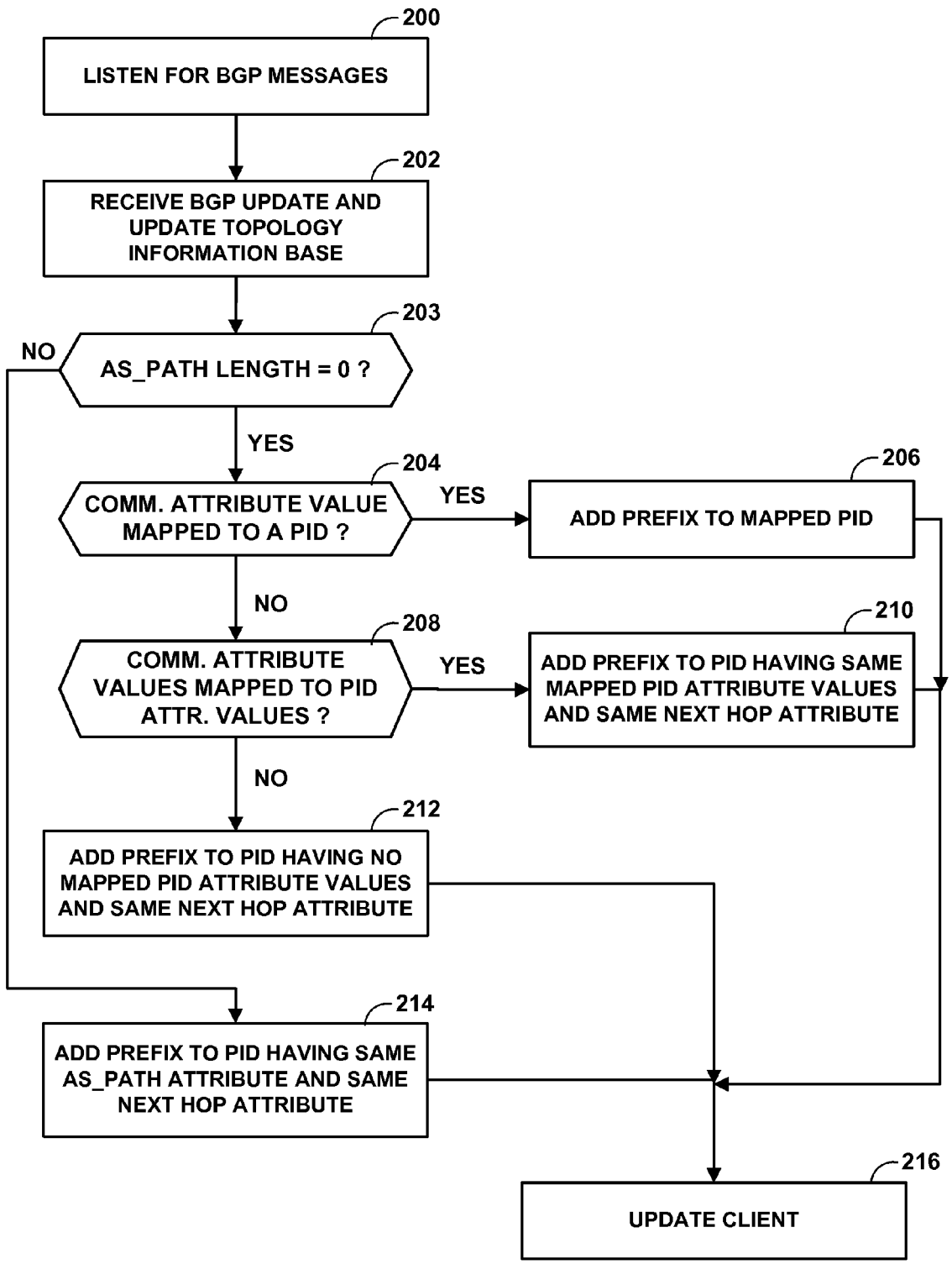
FIG. 8 is a flowchart illustrating an example mode of operation of an ALTO server for dynamically generating or modifying an inter-AS network map, according to the described techniques, for an autonomous system served by the ALTO server.
Figure 9A:
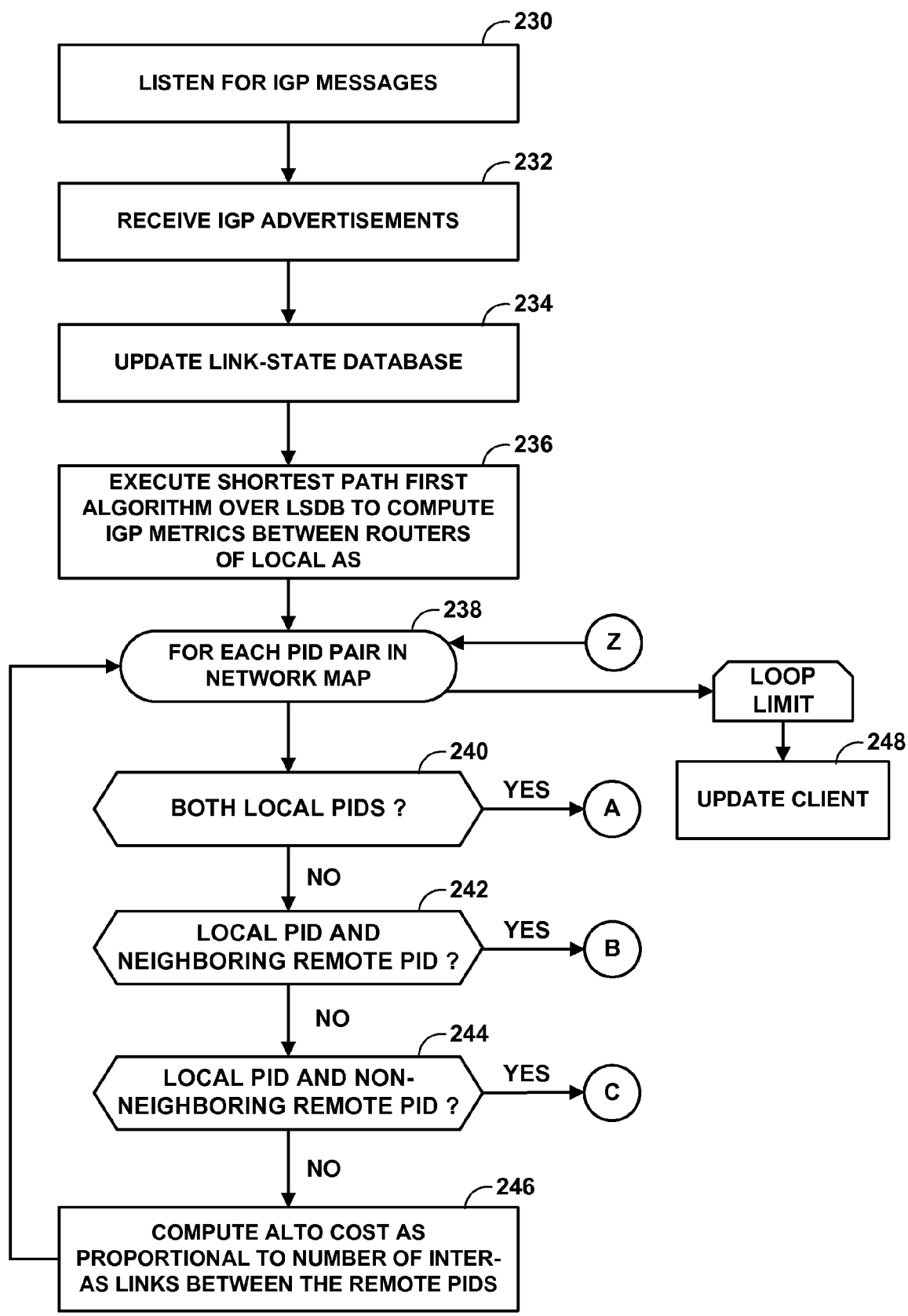
FIGS. 9A-9D present a flowchart that illustrates an example operation of an ALTO server to dynamically generate or modify an inter-AS cost map for an autonomous system served by the ALTO server according to the techniques described herein.
Figure 9B:
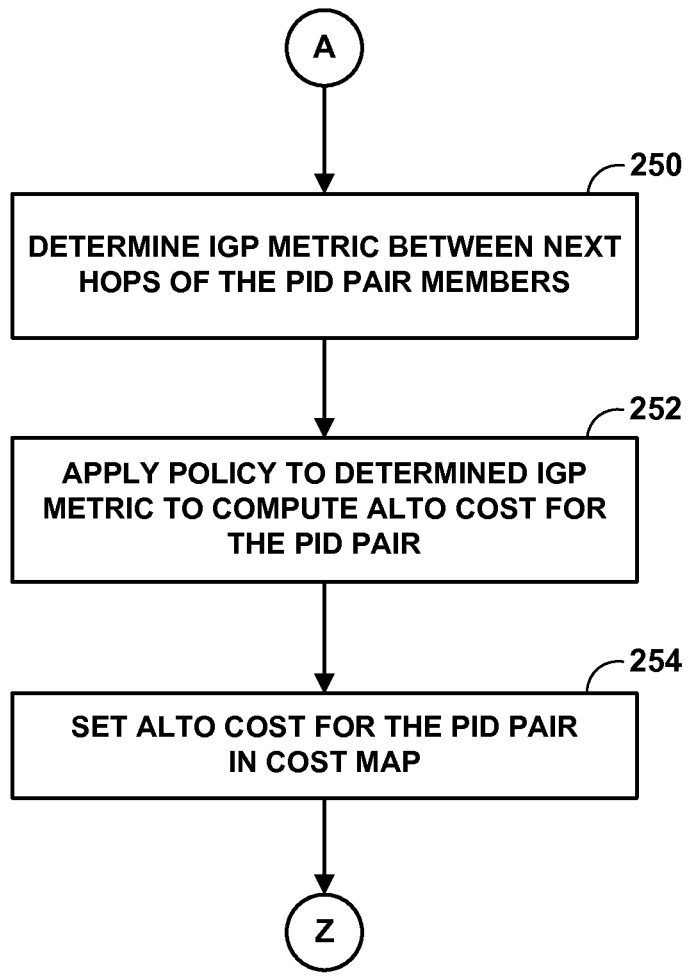
Figure 9C:
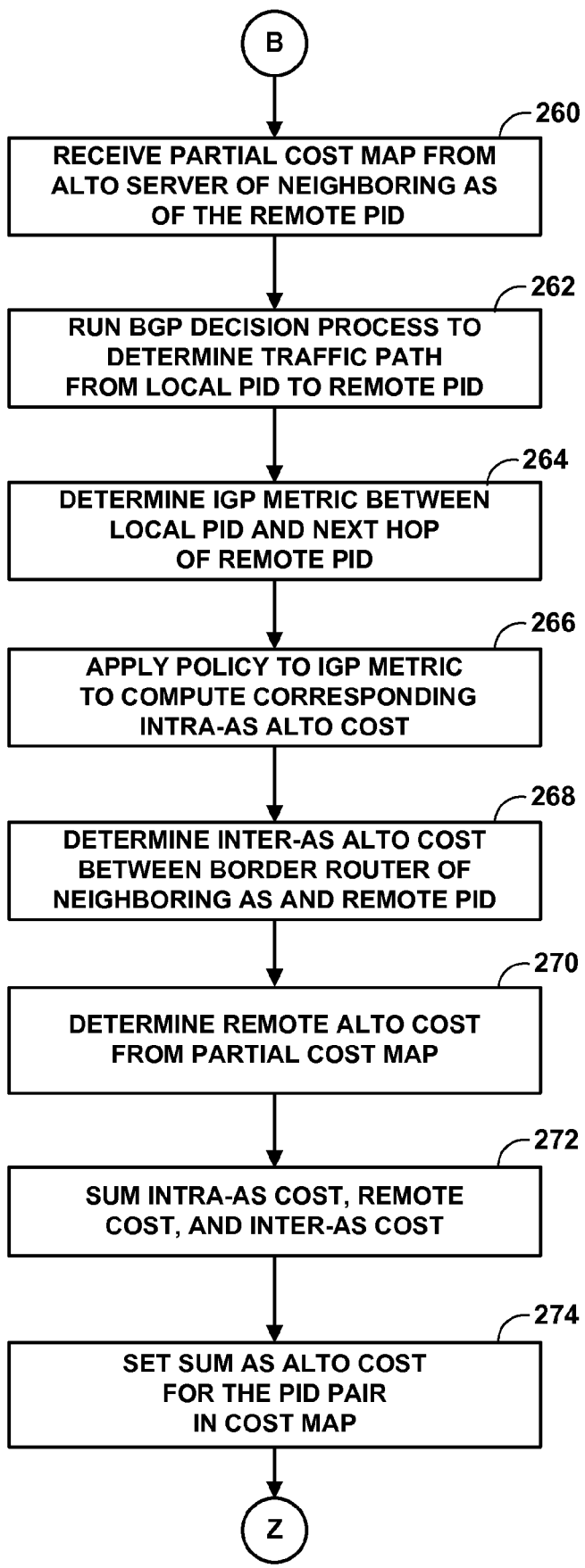
Figure 9D:
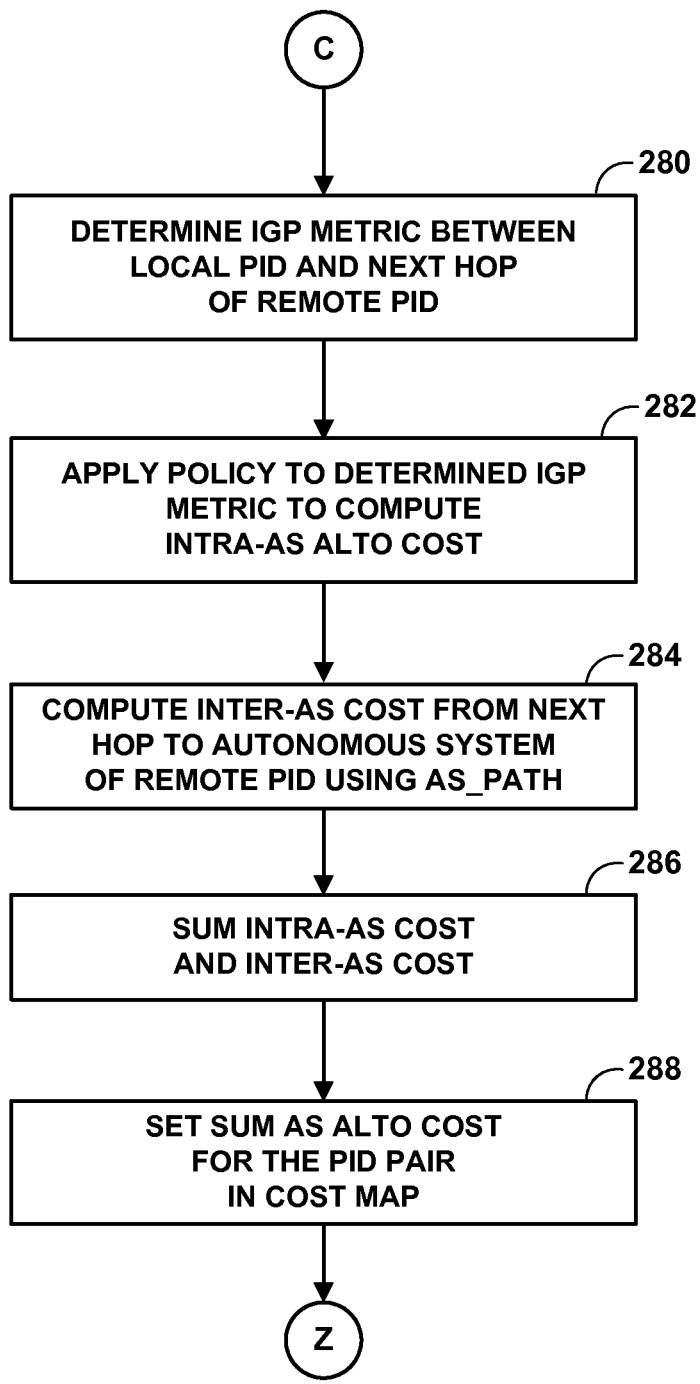

FIG. 8 is a flowchart illustrating an example mode of operation of ALTO server 100 for dynamically generating or modifying an inter-AS network map for an autonomous system served by ALTO server 100 according to the described techniques. BGP listener 124 operates as a passive BGP listener to peer with BGP speakers of the autonomous system and receive BGP messages (200). BGP in this instance may refer to Interior BGP. When BGP listener 124 receives a BGP UPDATE message, BGP listener 124 installs the received route to topology information base 116 (202). In some instances, ALTO server 100 runs a BGP decision process over topology information base 116 to select routes for processing.

Network map module 106 of ALTO server 100 analyzes the BGP UPDATE message attributes to determine whether the route originated in the autonomous system (AS) of ALTO server 100, that is, if the length of the AS_PATH attribute is equal to zero (203). If the route originated in a different AS (NO branch of 203), PID generator 110 adds the advertised prefix to a PID of network map 120 (in this example, an inter-AS network map) that has both the same AS_PATH attribute and the same NEXT_HOP attribute as that of the route (214). If such a PID does not yet exist in network map 120, PID generator 110 creates a new PID, sets the PID NEXT_HOP attribute to the NEXT_HOP value of the route, sets the PID AS_PATH attribute to the AS_PATH value of the route, and adds the prefix to the new PID in network map 120. If some instances, network map module 106 generates an intra-AS network map that only includes prefixes served by the autonomous system of ALTO server 100. In such instances, PID generator 110 ignores all advertised prefixes for which the AS_PATH length exceeds 0 and may therefore skip step 214.

If the route originated in the AS of ALTO server 100 (YES branch of 203), attribute module 108 determines whether the route includes a BGP community attribute or extended community attribute that is mapped, in provisioning policies 126, to a particular PID (204). If so (YES branch of 204), then attribute module 108 directs PID generator 110 to add the advertised prefix to the mapped PID (206). If necessary, PID generator 110 creates the mapped PID in network map 120.

Attribute module 108 determines whether any of the one or more community attribute values embedded in the BGP UPDATE message are mapped within community attribute map 118 to PID attribute values (208). If so (YES branch of 208), attribute module 108 directs PID generator 110 to add the advertised prefix to a PID in network map 120 that (1) has the same set of mapped PID attributes to which the community attribute values of the prefix are mapped in community attribute map 118, and (2) also has the same NEXT_HOP attribute as the advertised prefix (210). In other words, PID generator 110 aggregates prefixes tagged with the same set of mapped community attribute values and the same NEXT_HOP into a single PID. If necessary, PID generator 110 creates such a PID in network map 120.

If the advertised prefix is not mapped in either community attribute map 118 or provisioning policies 126, PID generator 110 adds the prefix to a PID in network map 120 that has no mapped PID attribute value and the yet has the same NEXT_HOP attribute as the advertised prefix (212). If necessary, PID generator 110 creates such a PID in network map 120. After dynamically generating or modifying network map 120, client interface 114 provides the updated network map to ALTO clients of ALTO server 100 in update message 132 (216).

FIGS. 9A-9D present a flowchart that illustrates an example operation of ALTO server 100 to dynamically generate or modify an inter-AS cost map for an autonomous system served by ALTO server 100 according to the techniques described herein. IGP listener 130 executes a routing protocol to receive routing information in routing protocol messages from internal routers of the autonomous system that includes ALTO server 100 (230). When IGP listener 130 receives routing protocol information (232), such as link-state advertisements, IPG listener 130 installs the routing information to a link-state database of topology information base 116 (234). In accordance with the routing protocol, IGP listener 130 executes a shortest-path first algorithm over the LSDB to compute IGP metric between routers of the autonomous system that includes ALTO server 100 (236). IGP listener 130 may store the IGP metrics to topology information base 116.

Cost map module 112 of ALTO server 100 computes and sets ALTO costs for each PID pair generated by network map module 106 in cost map 122. In this instance, the cost map is an inter-AS cost map. In some instances, however, cost map module 112 generates an intra-AS in addition to, or instead of, the inter-AS cost map as cost map 122.

Cost map module 112 computes ALTO costs differently for different combinations of PID pair member PID types. For each PID pair in network map 120 (238), cost map module 112 determines whether both member PIDs of the PID pair include prefixes that are local to the autonomous system that includes ALTO server 100 (i.e., whether the member PIDs are local PIDs) (240). If so (YES branch of 240), cost map module 112 determines the IGP metric, from topology information base 116, between the respective next hop routers identified in the NEXT_HOP attribute of the member PIDs of the PID pair (250). Cost map module 112 applies one or more policies of provisioning policies 126 to the determined IGP metric to compute an ALTO cost for the PID pair (252), then sets this ALTO cost for the PID pair in cost map 122 (254).

If one member PID of the PID pair is local and the other member PID is non-local (i.e., remote) (NO branch of 240), then cost map 112 determines whether the remote member PID is located in a neighboring autonomous system, as identified for example by the remote member PID AS identifier attribute (242). If located in a neighboring AS (YES branch of 242), client interface 114 receives a partial cost map from an ALTO server of the neighboring autonomous system that serves the prefixes of the remote PID (260). The partial cost map includes ALTO Network map module 106 runs a BGP decision process with topology information of topology information base 116 that accords with the perspective of the local PID member of the PID pair in order to identify the likely traffic path from the local PID to the remote PID (262).

The ALTO cost for the PID pair is the sum of the intra-AS and inter-AS ALTO costs for the identified traffic path. Cost map module 112 queries topology information base 116 to obtain the IGP metric between the next hop router identified in the NEXT_HOP attribute of the local member PID and the next hop router identified in the NEXT_HOP attribute of the remote member PID (264). Cost map module 112 applies one or more policies of provisioning policies 126 to the determined IGP metric to compute an intra-AS ALTO cost (266). Cost map module 112 an inter-AS ALTO cost between the border routers that connect the AS and the neighboring AS along the identified traffic path (268). This inter-AS ALTO may be configured in topology information base 116. Cost map module 112 queries the partial cost map received by client interface 114 to obtain a remote ALTO cost between the border router of the neighboring AS that lies along the identified traffic path and prefixes of the remote PID (270). Cost map module 112 computes the sum of the intra-AS cost, the remote cost, and the inter-AS cost (272) and sets the sum as the ALTO cost for the PID pair in cost map 122 (274).

If the PID pair includes both a local PID and a non-neighbor remote PID (YES branch of 244), the ALTO cost for the PID pair is set as the sum of the intra-AS cost and the inter-AS cost from the autonomous system that includes ALTO server 100 to the remote AS that serves the prefixes of the remote PID. Cost map module 112 queries topology information base 116 to obtain the IGP metric between the next hop router identified in the NEXT_HOP attribute of the local member PID and the next hop router identified in the NEXT_HOP attribute of the remote member PID (280). Cost map module 112 applies one or more policies of provisioning policies 126 to the determined IGP metric to compute an intra-AS ALTO cost (282).

In this example, a default inter-AS ALTO cost is configured in topology information base 116. Cost map module 112 next determines the AS_PATH length from the AS_PATH attribute of the remote PID and then computes the inter-AS ALTO cost as the product of the AS_PATH length and the default inter-AS ALTO cost (284). Cost map module 112 sums the inter-AS ALTO cost with the intra-AS ALTO cost (286) and sets the sum as the ALTO cost for the PID pair in cost map 122 (288). In some instances, administrator 138 configures topology information base 116 with inter-AS costs between autonomous system identified by AS ID. In such instances, cost map module 116 may query topology information base 116 to obtain a more accurate inter-AS costs to compute a total inter-AS cost from the local PID to the remote PID.

If both members of the PID pair are remote PIDs (NO branch of 244), the cost map module 112 sets the ALTO cost for the PID pair as proportional to the number of inter-AS links between the remote PIDs (246). In one example, cost map module 112 may determine the number of inter-AS links by analyzing the AS_PATH attributes of the remote PIDs to find the AS_PATH value that includes each of the respective AS IDs of the respective ASes that serve the remote PIDs. Cost map module 112 determines the number of inter-AS links from the determined value and calculates the ALTO cost as the product of the number of inter-AS links and the default inter-AS ALTO cost. If neither PID has such an AS_PATH value, cost map module 112 may be unable to determine the inter-AS ALTO cost and sets the ALTO cost for the PID pair to infinity. After dynamically generating or modifying cost map 122, client interface 114 provides the updated cost to ALTO clients of ALTO server 100 in update message 132 (248).

Figure 10:
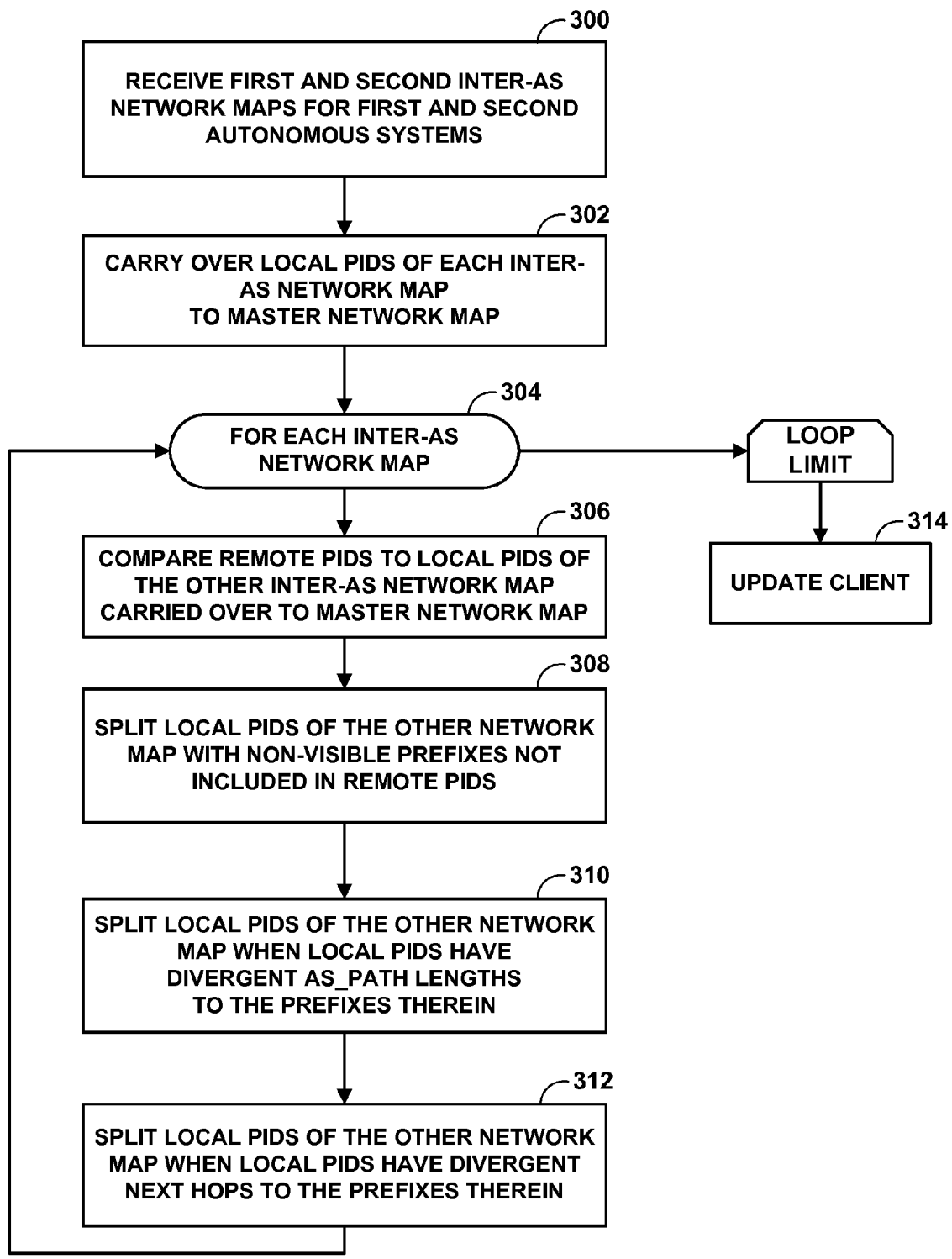
FIG. 10 is a flowchart illustrating an example operation of an ALTO server to generate a master ALTO network map according to the techniques set forth herein.

FIG. 10 is a flowchart illustrating an example operation of ALTO server 100 to generate a master ALTO network map according to the techniques set forth herein. In this example operation, client interface 114 receives first and second inter-AS network maps from respective ALTO servers operating within first and second autonomous systems (300). In some examples, ALTO server 100 may comprise one of these respective ALTO servers and in such examples ALTO server 100 uses inter-AS network and cost map that it has generated to generate master network and cost maps.

The inter-AS network maps each include local PIDs that network map module 106 "carries over" to network map 120 (in this operation, network map 120 is a master network map for the network) (302). That is, network map module 106 copies the prefixes, attributes, and other values of the local PIDs into corresponding PIDs for network map 120.

For each of the first and second inter-AS network maps (304), network map module 106 compares the remote PIDs of the inter-AS network map to local PIDs carried over to the master network map 120 from the other inter-AS network map (306). In particular, network map module 106 splits PIDs of the master network map 120 when such PIDs, corresponding to local PIDs of the other inter-AS network map, have prefixes that are not advertised to the AS of the inter-AS network map, as evidenced by prefixes that are not included in the remote PIDs (308).

In addition, network map module 106 splits PIDs of the master network map 120 when such PIDs, corresponding to local PIDs of the other inter-AS network map, have divergent AS_PATH lengths according to the remote PIDs (310). That is, when the remote PIDs separate prefixes to a single local PID of the other inter-AS network map according to different AS_PATH lengths to the prefixes, network map module 106 splits the corresponding PID for the local PID in master network map 120 according to the separation defined by the remote PIDs. Network map module 106 additionally splits PIDs of the master network map 120 when such PIDs, corresponding to local PIDs of the other inter-AS network map, have divergent NEXT_HOP attribute values according to the remote PIDs (312). That is, when the remote PIDs separate prefixes to a single local PID of the other inter-AS network map according to different NEXT_HOP values for the prefixes, network map module 106 splits the corresponding PID for the local PID in master network map 120 according to the separation defined by the remote PIDs. After dynamically generating or modifying master network map 120, client interface 114 provides the updated network map in update message 132 to ALTO clients of ALTO server 100 or to other ALTO servers in various ASes of the network (314).

Figure 11:
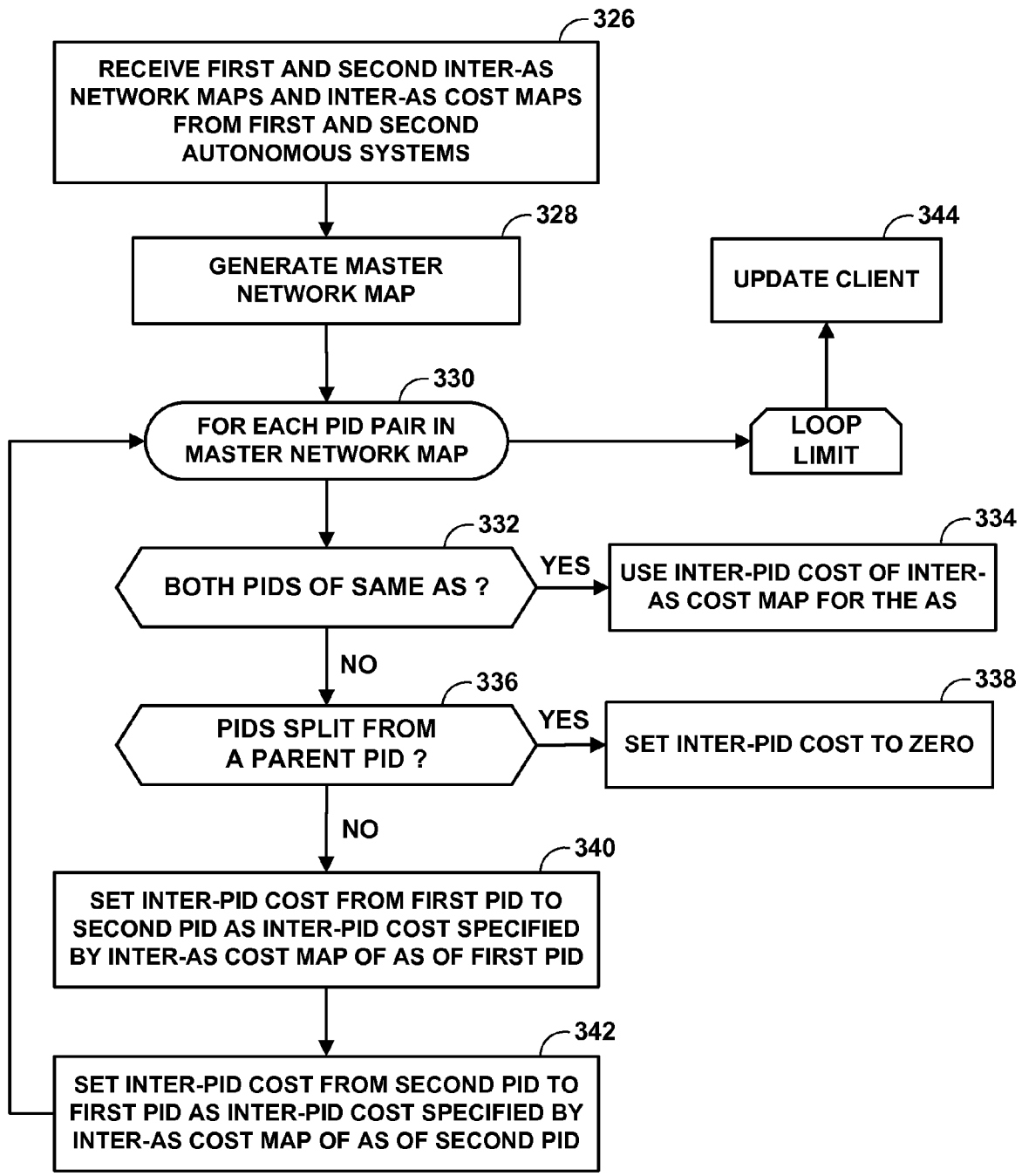
FIG. 11 is a flowchart illustrating an example operation of an ALTO server to generate master ALTO network and cost maps according to the techniques set forth herein.

FIG. 11 is a flowchart illustrating an example operation of ALTO server 100 to generate master ALTO network and cost maps according to the techniques set forth herein. In this example operation, client interface 114 receives first and second inter-AS network and cost maps from respective ALTO servers operating within first and second autonomous systems (326). In some examples, ALTO server 100 may comprise one of these respective ALTO servers and in such examples ALTO server 100 uses inter-AS network and cost map that it has generated to generate master network and cost maps. Network map module 106 generates a master network map 120 using the first and second inter-AS network maps (328). While illustrated and described sequentially, the operations of generating a master network map 120 and master cost map 122 may occur concurrently.

Cost map module 112 then assembles corresponding master cost map 122 for master network map 120. In this example, for each PID pair in master network map 120 (330), cost map module 112 determines whether both member PIDs are carried over from the same inter-AS network map, i.e., whether the PIDs are served by the same autonomous system (332). If so (YES branch of 332), cost map module 112 sets the ALTO cost for the PID pair to the ALTO cost for the corresponding PIDs as specified in the inter-AS cost map for the autonomous system that serves the PIDs (334). If the PID members represent a "split" PID that network map module 106 created to account for divergence in the first and second inter-AS network maps, cost map module 112 sets the ALTO cost for the PID pair to zero to reflect that the prefixes of these PID are aggregated into the same PID by the ALTO server of the autonomous system that serves these PIDs (338).

If the PID members include prefixes from both the first and second inter-AS network maps (NO branch of 336), cost map module 112 sets the unidirectional ALTO costs between the PID members using costs from both the first and second inter-AS cost maps. Specifically, cost map module 112 sets the ALTO cost from the first PID member to the second PID member in master cost map 122 as the cost specified by the inter-AS cost map provided by the autonomous system that serves the first PID (340). Cost map module 112 sets the ALTO cost from the second PID member to the first PID member in master cost map 122 as the cost specified by the inter-AS cost map provided by the autonomous system that serves the second PID (342). After generating the master network and cost maps, client interface 114 provides the updated maps in update message 132 to ALTO clients of ALTO server 100 or to other ALTO servers in various ASes of the network (344).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:
1. A method comprising:
executing a routing protocol on an application-layer traffic optimization (ALTO) server to receive layer three (L3) network topology information defining routes to a set of endpoints of a network;
aggregating, with the ALTO server, the set of endpoints into one or more topological groupings (PIDs), wherein each PID of the PIDs is associated with different endpoints of the set of endpoints;
receiving, with the routing protocol, a topology information advertisement that specifies one or more routes and includes network address information identifying endpoints of the set of endpoints, wherein the topology information advertisement comprises a Border Gateway Protocol (BGP) UPDATE message that specifies a BGP community attribute value for the identified endpoints;
aggregating, with the ALTO server, the identified endpoints into a first PID of the PIDs based at least on the BGP community attribute value for the identified endpoints;

generating, with the ALTO server, an ALTO network map that includes a different PID entry to describe each of the PIDs; and sending the ALTO network map from the ALTO server to an ALTO client.

2. The method of claim 1, wherein the topology information advertisement specifies a next hop attribute for the identified endpoints that identifies a router of the network, the method further comprising:

aggregating, with the ALTO server, the identified endpoints into the first PID based at least on the next hop attribute for the identified endpoints.

3. The method of claim 1, wherein the network comprises a plurality of autonomous systems, the method further comprising:

determining, with the ALTO server, one of the plurality of autonomous systems that originated the topology information advertisement; and aggregating, with the ALTO server, the identified endpoints into the first PID based at least on the one of the plurality of autonomous systems that originated the topology information advertisement.

4. The method of claim 1, wherein the topology information advertisement specifies one or more prefix attributes for the identified endpoints in addition to the BGP community attribute value for the identified endpoints, and the method further comprising:

aggregating, with the ALTO server, the identified endpoints into the first PID based at least on the prefix attributes for the identified endpoints.

5. The method of claim 1, wherein aggregating the identified endpoints further comprises:

applying, with the ALTO server, a community attribute map that maps the BGP community attribute value for the identified endpoints to a PID identifier that identifies the first PID.

6. The method of claim 4, further comprising:

applying, with the ALTO server, a community attribute map that maps one of the prefix attributes for the identified endpoints to a PID identifier that identifies the first PID.

7. The method of claim 1, further comprising:

assigning, with the ALTO server, the BGP community attribute value for the identified endpoints as a PID attribute of the first PID;

receiving, with the routing protocol, an additional topology information advertisement, wherein the additional topology information advertisement includes additional network address information identifying an additional one or more of endpoints, and further specifies a BGP community attribute value for the additional endpoints;

aggregating, with the ALTO server, the additional endpoints into the first PID when the BGP community attribute value for the additional endpoints matches the PID attribute of the first PID; and aggregating, with the ALTO server, the additional endpoints into a second one of the PIDs when the BGP community attribute value for the additional endpoints does not match the PID attribute of the first PID.

8. The method of claim 1, wherein the network comprises a plurality of autonomous systems, the method further comprising:

determining from the topology information advertisement, with the ALTO server, an autonomous system path to one of the plurality of autonomous systems that originated the topology information advertisement; and aggregating, with the ALTO server, the identified endpoints into the first PID based at least on the autonomous system path.

9. The method of claim 8, further comprising:

assigning, with the ALTO server, the autonomous system path as a PID attribute of the first PID;

receiving, with the routing protocol, an additional topology information advertisement, wherein the additional topology information advertisement includes additional network address information identifying an additional one or more of the endpoints, and specifies an additional autonomous system path to one of the plurality of autonomous systems that originated the additional endpoints;

aggregating, with the ALTO server, the additional endpoints into the first PID when the PID has a PID attribute that specifies the additional autonomous system path; and aggregating, with the ALTO server, the additional endpoints into a second one of the PIDs when the first PID does not have a PID attribute that specifies the autonomous system path.

10. The method of claim 9, wherein the additional autonomous system path is specified by a PID attribute of the first PID, the method further comprising:

determining from the topology information advertisement, with the ALTO server, a next hop attribute for the identified endpoints that identifies a router of the network;

assigning the next hop attribute to the additional PID;

determining from the additional topology information advertisement, with the ALTO server, an additional next hop attribute for the additional endpoints that identifies an additional router of the network;

aggregating, with the ALTO server, the additional endpoints into the first PID when the PID has a next hop attribute that specifies the additional router; and aggregating, with the ALTO server, the additional endpoints into a second one of the PIDs when the first PID does not have a next hop attribute that specifies the additional router.

11. The method of claim 1, further comprising:

performing, with the ALTO server, a decision process prior to aggregating the identified endpoints into first PID to select a route for the identified endpoints from a plurality of routes for the identified endpoints defined in a topology information base of the ALTO server.

12. The method of claim 1, wherein the ALTO server comprises a router.

13. The method of claim 1, further comprising:

receiving, with the routing protocol, routing information for an autonomous system that includes the ALTO server;

computing, with the ALTO server, an ALTO cost for a pair of the PIDS of the ALTO network map based at least on the routing information, wherein the pair of the PIDS comprises a first member and a second member;

generating an ALTO cost map that includes an entry that specifies the ALTO cost between the first member and second member of the pair of PIDs; and sending the ALTO cost map from the ALTO server to an ALTO client.

14. The method of claim 13, wherein receiving, with the routing protocol, routing information comprises receiving, with an interior gateway protocol, one or more link state advertisements that includes a list of links to one or more routers within the autonomous system, wherein each link in the list of links includes an associated metric for the link, the method further comprising:

storing the list of links to a link-state database of the ALTO server; and executing a shortest-path-first algorithm over the link-state database to determine metrics between routers within the autonomous system, wherein computing an ALTO cost for the pair of PIDs comprises identifying a metric calculated by the shortest-path-first algorithm between the next hop of the first member of the pair of PIDs and the next hop of the second member of the pair of PIDs.

15. A method comprising:

executing a routing protocol with an application-layer traffic optimization (ALTO) server;

receiving, with the ALTO server by the routing protocol, routing information for an autonomous system that includes the ALTO server;

computing, with the ALTO server, an ALTO cost for a pair of topological groupings (PIDs) based at least on the routing information, wherein the pair of PIDs comprises a first member and a second member, wherein the first member of the pair of PIDs specifies a network address prefix advertised by the autonomous system that includes the ALTO server and the second member of the pair of PIDs specifies a network address prefix advertised by a remote autonomous system of the network; and storing, with the ALTO server, a default inter-AS cost that specifies an ALTO cost to traverse a path from any autonomous system of the network to any neighboring autonomous system of the network, wherein computing the ALTO cost for the pair of PIDs based at least on the routing information comprises:

determining, with the ALTO server, a length of an autonomous system path to the remote autonomous system from the autonomous system that includes the ALTO server;

computing, with the ALTO server, an inter-AS cost for the pair of PIDs based at least upon the length of the autonomous system path and the default inter-AS cost;

computing, with the ALTO server, an intra-AS cost from a next hop of the first member of the pair of PIDs to a next hop of the second member of the pair of PIDs based at least on the routing information; and computing, with the ALTO server, the ALTO cost based at least on the inter-AS cost and the intra-AS cost.

16. The method of claim 15, wherein computing, with the ALTO server, an ALTO cost with the ALTO server comprises summing the inter-AS cost and the intra-AS cost, and wherein computing, with the ALTO server, an inter-AS cost for the pair of PIDs comprises computing a product of the length of the autonomous system path and the default inter-AS cost.

17. The method of claim 15, wherein the pair of PIDs comprises a first pair of PIDs, the method further comprising:

computing, with the ALTO server, an ALTO cost for a second pair of PIDs based at least on the routing information, wherein the pair of PIDs comprises a first member and a second member, and wherein the first member of the second pair of PIDs specifies a network address prefix advertised by a first remote autonomous system of the network and the second member of the second pair of PIDs specifies a network address prefix advertised by a second remote autonomous system of the network;

determining, with the ALTO server, a length of an autonomous system path to the second remote autonomous system from the first remote autonomous system, wherein computing, with the ALTO server, an ALTO cost for the second pair of PIDs comprises computing an ALTO cost based at least upon the length of the autonomous system path to the second remote autonomous system from the first remote autonomous system and the default inter-AS cost.

18. The method of claim 17, wherein computing an ALTO cost comprises computing a product of the length of the autonomous system path to the second remote autonomous system from the first remote autonomous system and the default inter-AS cost.

19. The method of claim 17, wherein determining, with the ALTO server, the length of the autonomous system path to the second remote autonomous system from the first remote autonomous system comprises:

reading an autonomous system path attribute of the second member of the second pair of PIDs;

determining an autonomous system identifier for the first remote autonomous system from the first member of the second pair of PIDs and an autonomous system identifier for the second remote autonomous system from the second member of the second pair of PIDs; and determining the length of the autonomous system path in the autonomous system path attribute from the autonomous system identifier for the first remote autonomous system to the autonomous system identifier for the second remote autonomous system.

20. The method of claim 15, wherein the pair of PIDs comprises a first pair of PIDs, the method further comprising:

computing, with the ALTO server, an ALTO cost for a second pair of PIDs based at least on the routing information, wherein the second pair of PIDs comprises a first member and a second member;

receiving a partial inter-AS cost map for a neighboring autonomous system of the autonomous system that includes the ALTO server, wherein the first member of the second pair of PIDs specifies a network address prefix advertised by the autonomous system that includes the ALTO server and the second member of the second pair of PIDs specifies a network address prefix advertised by the neighboring autonomous system, wherein the partial inter-AS cost map specifies ALTO costs for PIDs of the neighboring autonomous system;

computing, with the ALTO server, a local intra-AS cost from a next hop of a first member of the second pair of PIDs to a next hop of the second member of the second pair of PIDs based at least on the routing information;

determining using the partial inter-AS cost map, with the ALTO server, a remote intra-AS cost from a border router of the neighboring autonomous system to a router of the neighboring autonomous system that originates routing information for the network address prefixes specified by the second member of the second pair of PIDs, wherein the border router advertises the network address prefix specified by the second member of the pair of PIDs to a next hop of the first member of the second pair of PIDs; and wherein computing, with the ALTO server, the ALTO cost for the second pair of PIDs comprises computing the ALTO cost for the second pair of PIDs based at least on the local intra-AS cost, the remote intra-AS cost, and an inter-AS cost that specifies a cost to traverse a path from the autonomous system that includes the ALTO server to the neighboring autonomous system.

21. The method of claim 20, further comprising:
performing, with the ALTO server, a decision process to select a route for the network address prefix specified by the second member of the second pair of PIDs from a plurality of routes defined in topology information of the ALTO server for the network address prefix specified by the second member of the second pair of PIDs.

22. The method of claim 15,
wherein receiving, with the routing protocol, routing information comprises receiving, with a border gateway protocol (BGP), one or more advertisements that include traffic engineering data for the autonomous system that includes the ALTO server, the method further comprising:
storing the traffic engineering data to a traffic engineering database (TED) of the ALTO server; and
determining metrics between routers within the autonomous system based at least on the traffic engineering data stored to the TED,
wherein computing an ALTO cost for the pair of PIDs comprises identifying a metric calculated by the shortest-path-first algorithm between a next hop of the first member of the pair of PIDs and a next hop of the second member of the pair of PIDs.

23. A method comprising:
receiving a first inter-AS network map and a first inter-AS cost map for a first autonomous system with a master application-layer traffic optimization (ALTO) server, wherein the first inter-AS network map comprises a first set of one or more local and remote topological groupings (PIDs), wherein each local and remote PID of the first inter-AS network map is associated with a different subset of a set of endpoints of a network, wherein the local PIDs of the first inter-AS network map specify network address prefixes of the first autonomous system and remote PIDs of the first inter-AS network map specify network address prefixes of a second autonomous system, wherein the first inter-AS cost map specifies ALTO costs for pairs of PIDs of the first inter-AS network map;
receiving a second inter-AS network map for the second autonomous system with the master ALTO server, wherein the second inter-AS network map comprises a second set of one or more local and remote PIDs, wherein each local and remote PID of the second inter-AS network map is associated with a different subset of the set of endpoints of the network, wherein the local PIDs of the second inter-AS network map specify network address prefixes of the second autonomous system and remote PIDs of the second inter-AS network map specify network address prefixes of the first autonomous system, wherein the second inter-AS cost map specifies ALTO costs for pairs of PIDs of the second inter-AS network map;
generating, with the master ALTO server, a master ALTO network map for the network based at least on the first inter-AS network map and the second inter-AS network map; and
outputting the master ALTO network map from the master ALTO server.

24. The method of claim 23, further comprising:
copying, with the master ALTO server, local PIDs of the first inter-AS network map and local PIDs of the second inter-AS network map to the master ALTO network map; and splitting a PID of the master ALTO network map copied from the first inter-AS network map into a first split PID that includes a first network address prefix of the PID and a second split PID that includes a second network address prefix of the PID.

25. The method of claim 24, further comprising:
setting an ALTO cost, in a master ALTO cost map, for a PID pair of the master network map that includes the first split PID and the second split PID to zero; and
outputting the master ALTO cost map from the master ALTO server.

26. The method of claim 25, further comprising:
setting an ALTO cost, in the master ALTO cost map, for a PID pair that includes the first split PID and an additional PID of the master ALTO network map copied from the first inter-AS network map to an ALTO cost specified by the first inter-AS cost map for a PID pair that includes the PID and the additional PID.

27. The method of claim 25, further comprising:
setting an ALTO cost, in the master ALTO cost map, for a PID pair that includes the first split PID and an additional PID of the master ALTO network map copied from the second inter-AS network map to an ALTO cost specified by the first inter-AS cost map for a PID pair that includes the PID and another PID of the first inter-AS network map that specifies a prefix of the PID of the master ALTO network map copied from the second inter-AS network map.

28. The method of claim 24, wherein splitting the PID comprises:
splitting the PID upon determining the first network address prefix of the PID is not specified by any remote PIDs of the second inter-AS network map and upon determining the second network address prefix of the PID is specified by a remote PID of the second inter-AS network map.

29. The method of claim 24, wherein splitting the PID comprises:
splitting the PID upon determining the first network address prefix of the PID is specified by a first remote PID of the second inter-AS network map having a first next hop attribute and upon determining the second network address prefix of the PID is specified by a second remote PID of the second inter-AS network map having a second next hop attribute that is different from the first next hop attribute.

30. The method of claim 24, wherein splitting the PID comprises:
splitting the PID upon determining the first network address prefix of the PID is specified by a first remote PID of the second inter-AS network map having a first autonomous system path attribute and upon determining the second network address prefix of the PID is specified by a second remote PID of the second inter-AS network map having a second autonomous system path attribute that is different from the first autonomous system path attribute.

31. An application-layer traffic optimization (ALTO) server comprising:
a control unit having one or more processors;
a topology information base;
a Border Gateway Protocol (BGP) listener of the control unit that executes a routing protocol to receive layer three (L3) network topology information defining routes to a set of endpoints of a network that includes an autonomous system that includes the ALTO server;

a PID generator of the control unit that aggregates the set of endpoints into one or more topological groupings (PIDs), wherein each PID of the PIDs is associated with different endpoints of the set of endpoints, wherein the BGP listener receives a topology information advertisement that specifies one or more routes and includes network address information identifying endpoints of the set of endpoints, wherein the BGP listener stores the one or more routes to the topology information base, wherein the topology information advertisement comprises a Border Gateway Protocol (BGP) UPDATE message that specifies a BGP community attribute value for the identified endpoints, and wherein the PID generator aggregates the identified endpoints into a first PID of the PIDs based at least on the BGP community attribute value for the identified endpoints;

a network map module of the control unit that generates an ALTO network map that includes a different PID entry to describe each of the PIDs; and a client interface that sends the ALTO network map to an ALTO client.

32. The ALTO server of claim 31, wherein the topology information advertisement specifies a next hop attribute for the identified endpoints that identifies a router of the network, and wherein the PID generator aggregates the identified endpoints into the first PID based at least on the next hop attribute for the identified endpoints.

33. The ALTO server of claim 31, wherein the network comprises a plurality of autonomous systems, and wherein the PID generator determines from the topology information advertisement an autonomous system path to one of the plurality of autonomous systems that originated the topology information advertisement and aggregates the identified endpoints into the first PID based at least on the autonomous system path.

34. The ALTO server of claim 31, wherein the topology information advertisement specifies one or more prefix attributes for the identified endpoints in addition to the BGP community attribute value for the identified endpoints, and wherein the PID generator aggregates the identified endpoints into the first PID based at least on the prefix attributes for the identified endpoints.

35. The ALTO server of claim 31, further comprising:

a community attribute map that maps the BGP community attribute value for the identified endpoints to a PID identifier that identifies the first PID; and an attribute module of the control unit that reads applies the community attribute map to map the BGP community attribute value for the identified endpoints to the PID identifier and directs the PID generator to aggregate the identified endpoints into the first PID having the PID identifier.

36. The ALTO server of claim 31, further comprising:

an interior gateway protocol (IGP) listener of the control unit that executes an interior gateway protocol to receive one or more link state advertisements that includes a list of links to one or more routers within the autonomous system, wherein each link in the list of links includes an associated metric for the link, wherein the IGP listener stores the list of links to a link-state database of the topology information base and executes a shortest-path-first algorithm over the link-state database to determine metrics between routers within the autonomous system; and a cost map module of the control unit that computes an ALTO cost for a pair of PIDs of the ALTO network map based at least on the metrics and generates an ALTO cost map that includes an entry that specifies the ALTO cost between a first member and second member of the pair of PIDs, wherein the client interface sends the ALTO cost map to the ALTO client.

37. The ALTO server of claim 36, wherein the cost map module computes an ALTO cost for the pair of PIDs by identifying a metric calculated by the shortest-path-first algorithm between a next hop of the first member of the pair of PIDs and a next hop of the second member of the pair of PIDs.

38. The ALTO server of claim 36, further comprising:

a policy that specifies a default inter-AS cost that specifies an ALTO cost to traverse a path from an autonomous system of the network to a neighboring autonomous system of the network, wherein the cost map module computes an ALTO cost for the pair of PIDs based at least on the default inter-AS cost and the length of an autonomous system path from a next hop of the first member of the pair of PIDs and a next hop of the second member of the pair of PIDs.

39. The ALTO server of claim 31, wherein the ALTO server comprises a router, and further comprising:

a services unit of the control unit that executes the BGP listener, the PID generator, the network map module, and the client interface, wherein the services unit is an insertable component of the router.

40. The ALTO server of claim 31, further comprising:

a traffic engineering database (TED);

a cost map module of the control unit;

wherein the Border Gateway Protocol (BGP) listener receives one or more advertisements that include traffic engineering data for the autonomous system and stores the traffic engineering data to the TED, wherein the control unit uses the traffic engineering data to determine metrics between routers within the autonomous system, and wherein the cost map module computes an ALTO cost for a pair of PIDs of the ALTO network map based at least on the metrics and generates an ALTO cost map that includes an entry that specifies the ALTO cost between a first member and second member of the pair of PIDs.

41. An application-layer traffic optimization (ALTO) server comprising:

a control unit having one or more processors;

an interface of the control unit that receives first inter-AS network map and a first inter-AS cost map for a first autonomous system, wherein the first inter-AS network map comprises a first set of one or more local and remote subsets of topological groupings (PIDs), wherein each local and remote PID of the first inter-AS network map is associated with a different subset of a set of endpoints of a network, wherein the local PIDs of the first inter-AS network map specify network address prefixes of the first autonomous system and remote PIDs of the first inter-AS network map specify network address prefixes of a second autonomous system, wherein the first inter-AS cost map specifies ALTO costs for pairs of PIDs of the first inter-AS network map, wherein the interface receives a second inter-AS network map for the second autonomous system, wherein the second inter-AS network map comprises a second set of one or more local and remote PIDs, wherein each local and remote PID of the second inter-AS network map is associated with a different subset of the set of endpoints of the network, wherein the local PIDs of the second inter-AS network map specify network address prefixes of the second autonomous system and remote PIDs of the second inter-AS network map specify network address prefixes of the first autonomous system, wherein the second inter-AS cost map specifies ALTO costs for pairs of PIDs of the second inter-AS network map;

a network map module of the control unit that generates a master ALTO network map for the network based at least on the first inter-AS network map and the second inter-AS network map; and a client interface of the control unit that sends the master ALTO network map to an ALTO client.

42. The ALTO server of claim 41, further comprising:

a network map module of the control unit that copies local PIDs of the first inter-AS network map and local PIDs of the second inter-AS network map to the master ALTO network map, a PID generator of the control unit that splits a PID of the master ALTO network map copied by the network map module from the first inter-AS network map into a first split PID that includes a first network address prefix of the PID and a second split PID that includes a second network address prefix of the PID; and a cost map module of the control unit that sets an ALTO cost, in a master ALTO cost map for a PID pair of the master network map that includes the first split PID and the second split PID, to zero, wherein the client interface sends the master ALTO cost map to the ALTO client.

43. The ALTO server of claim 41, wherein the ALTO server comprises a router, and further comprising:

a services unit of the control unit that executes the interface, the client interface, and the network map module, wherein the services unit is an insertable component of the router.

* * * * *